(12) United States Patent
Sekiguchi et al.

(10) Patent No.: US 6,997,565 B2
(45) Date of Patent: Feb. 14, 2006

(54) LAMP, POLARIZATION CONVERTING OPTICAL SYSTEM, CONDENSING OPTICAL SYSTEM AND IMAGE DISPLAY DEVICE

(75) Inventors: Akira Sekiguchi, Tokyo (JP);
Tomohiro Sasagawa, Tokyo (JP);
Junichi Nishimae, Tokyo (JP);
Yoshiyuki Goto, Tokyo (JP); Kohei Teramoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/629,669

(22) Filed: Jul. 30, 2003

(65) Prior Publication Data

US 2004/0021827 A1    Feb. 5, 2004

(51) Int. Cl.
*G03B 21/20* (2006.01)
*F21V 7/00* (2006.01)
*F21V 7/06* (2006.01)
*F21V 7/09* (2006.01)

(52) U.S. Cl. .................. 353/102; 353/98; 362/296; 362/297

(58) Field of Classification Search .............. 353/31, 353/85–87, 97, 98, 122, 38, 102; 362/19, 362/558, 560, 561, 296, 297, 299, 300, 305, 362/307, 308, 309, 310, 311, 341, 347, 350
See application file for complete search history.

(56) References Cited

U.S. PATENT DOCUMENTS

| | | | | |
|---|---|---|---|---|
| 4,457,600 A | * | 7/1984 | Hall | 353/122 |
| 4,642,740 A | | 2/1987 | True | |
| 5,103,381 A | * | 4/1992 | Uke | 362/560 |
| 5,755,503 A | * | 5/1998 | Chen et al. | 353/38 |
| 5,973,841 A | * | 10/1999 | Watanabe | 359/618 |
| 6,464,362 B1 | * | 10/2002 | Sugawara et al. | 353/102 |
| 6,491,396 B1 | * | 12/2002 | Karasawa et al. | 353/20 |
| 6,499,845 B1 | * | 12/2002 | Sato | 353/38 |
| 6,578,996 B1 | * | 6/2003 | Kawashima et al. | 362/517 |
| 6,585,397 B1 | * | 7/2003 | Ebiko | 362/297 |
| 6,688,756 B1 | * | 2/2004 | Akiyama | 362/268 |
| 6,840,633 B1 | * | 1/2005 | Davis et al. | 353/98 |
| 2002/0048172 A1 | | 4/2002 | Wada et al. | |
| 2003/0174294 A1 | * | 9/2003 | Yanagisawa | 353/85 |
| 2004/0120153 A1 | * | 6/2004 | Pate | 362/296 |
| 2005/0078483 A1 | * | 4/2005 | Bernard et al. | 362/327 |

\* cited by examiner

*Primary Examiner*—W. B. Perkey
*Assistant Examiner*—Andrew Sever
(74) *Attorney, Agent, or Firm*—Leydig, Voit & Mayer, Ltd.

(57) ABSTRACT

A lamp has a deformed lamp reflector and a lamp front glass. The deformed lamp reflector is formed by deforming a paraboloid of revolution of a conventional lamp reflector to an aspherical reflection surface which is rotationally symmetrical with respect to an optical axis. The lamp front glass is obtained by deforming the incident plane of a conventional lamp front glass to an aspherical lens surface rotationally symmetric with respect to the optical axis. A light flux radiated from the center point of the light source of an illuminant is reflected by the deformed lamp reflector, and is output through the lens as a parallel light flux having a circular cross section equal in area to the lens.

7 Claims, 16 Drawing Sheets

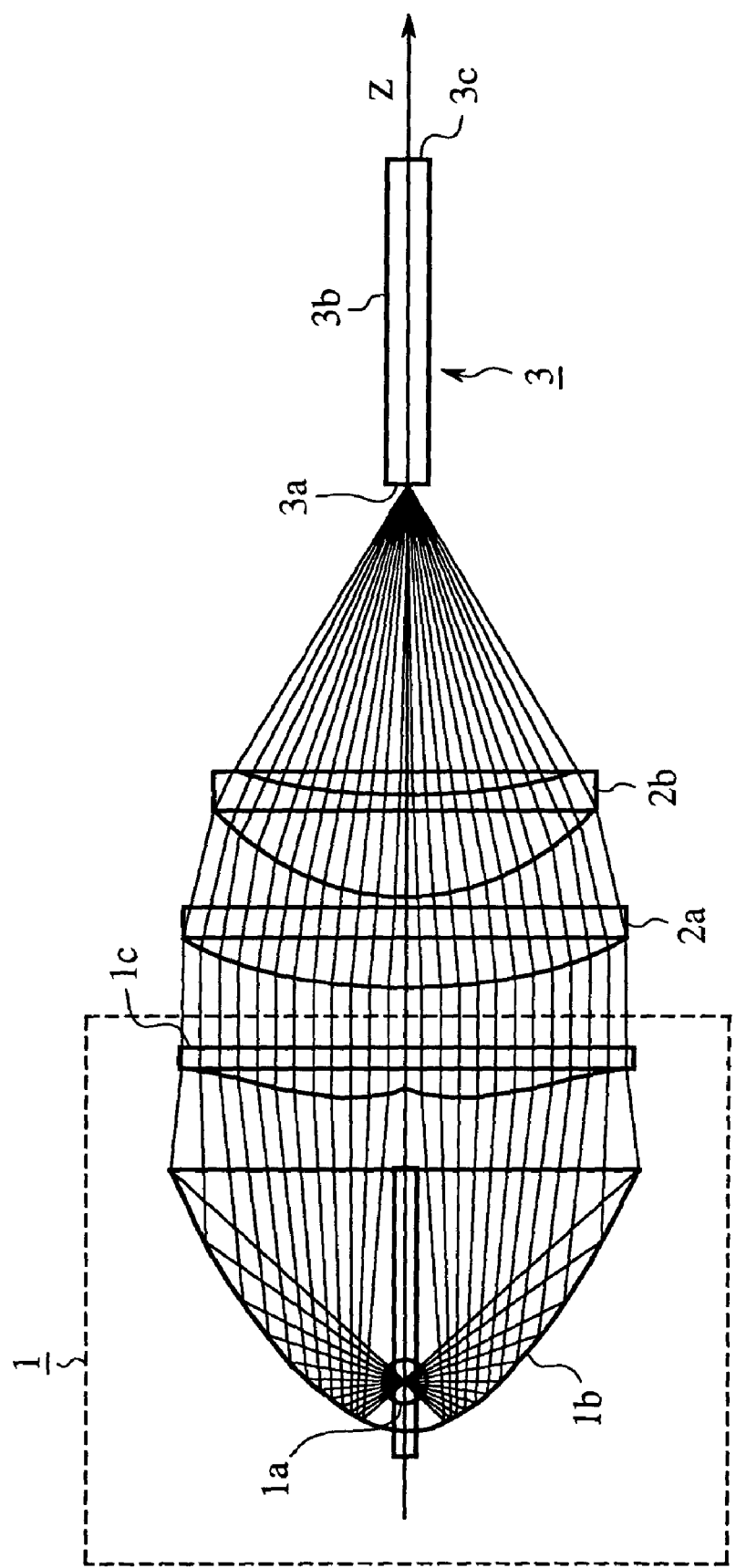

US 6,997,565 B2

LAMP, POLARIZATION CONVERTING OPTICAL SYSTEM, CONDENSING OPTICAL SYSTEM AND IMAGE DISPLAY DEVICE

BACKGROUND OF THE INVENTION

1. Field of the Invention

The present invention relates to a lamp having an illuminant (or light source) for emitting light rays approximately parallel to an optical axis within a desired radiation angle, to a polarization converting optical system, a condensing optical systems, and an image display device which use the lamp.

2. Description of the Related Art

FIG. 1 is a diagram showing a configuration of a condensing optical system using a conventional lamp and showing a sectional view of the condensing optical system which has been cut by an optional plane including an optical axis.

In FIG. 1, reference number 101 designates the conventional lamp, 101a denotes an illuminant, 101b indicates a lamp reflector, and 101c designates a lamp front glass.

The conventional lamp is made up of the illuminant 101a, the lamp reflector 101b, and the lamp front glass 101c.

The illuminant 101a has a glass bulb and electrodes placed at the center of the glass bulb. The light is generated in and emitted from a space between both the electrodes. The space between the electrodes is a light source of the illuminant 101a.

The lamp reflector 101b is a reflecting mirror formed on a surface that is a paraboloid of revolution, in which the illuminant 101a is located at the focus of the paraboloid of revolution (hereinafter referred to as "parabolic focus") which is at a center position with respect to the electrodes. The paraboloid of revolution reflects the light emitted by the illuminant 101a. The paraboloid of revolution means a curved surface obtained by rotating a part of the parabola around its central axis namely, an optical axis which goes straight through the focus.

When light rays which are completely parallel to each other traveling from an infinite distance are reflected by the paraboloid of revolution, it is well known that all of the reflected parallel light rays are directed to the parabolic focus. By using this principle and the reverse traveling feature of light, parallel light rays can be produced. That is, a point light source having no geometrical size is placed at the parabolic focus, the light rays reflected by the paraboloid of revolution become completely parallel light rays which travel in parallel to the rotation axis of paraboloid of revolution. Based on the above reasons, the parallel light rays can be produced using the light emitted from the illuminant 101a of the lamp 101 and reflected by the lamp reflector 101b, because the lamp 101 is the approximate point light source and the center point between the electrodes in the illuminant 101a is placed at the parabolic focus.

The lamp front glass 101c is so placed that it covers an aperture of the lamp reflector 101b. This prevents the occurrence of a rarely accident caused by explosion of the illuminant 101a, so that the lamp front glass 101c can prevent to spread the damage of the explosion to other optical parts.

The lights, of course, reflected by the lamp reflector 101b are radiated to external section of the lamp 101 through the lamp front glass 101c. In the conventional lamp 101, it is so designed that the incident plane (or incoming plane) and the outgoing plane of the lamp front glass 101c go straight to the optical axis so that the parallel lights from the lamp reflector 101b are not refracted.

Reference numbers 102a and 102b are spherical lenses, which are called condenser lens. The condenser lenses 102a and 102b perform condenser of lights output from the lamp front glass 101c into the focus (hereinafter referred to as "lens focus"). In general, the condenser lens comprises a plurality of lenses in order to suppress an aberration.

Reference 103 designates a column-shaped glass called "a rod integrator" having a configuration in which the light is input through its incident plane and transmitted through the inside of the rod integrator and output through its outgoing plane. In order to increase the efficiency (a light receiving efficiency) to receive lights at the incident plane and to suppress a loss as low as possible by increasing the amount of the incident light as large as possible, the incident plane of the rod integrator 103 is placed at the lens focus of the condenser lenses 102a and 102b. The line Z through which the center of the illuminant 101a, the center of the condenser lenses 102a and 102b, and the center of the incident plane of the rod integrator 103 are connected is a common optical axis. The positive direction (or forward direction) of the optical axis Z is a forward direction of the light.

The space closed to the optical axis Z indicated by reference character D is a dead zone where there is no light flux. The conventional condensing optical system comprises the lamp 101, the condenser lenses 102a and 102b, and the rod integrator 103.

Before the explanation of the operation of the condensing optical system shown in FIG. 1, a description will now be given of the explanation of a brilliance distribution characteristic and an orientation distribution characteristic of the illuminant 101a.

FIG. 2 is a diagram showing a typical brilliance distribution characteristic of the illuminant 101a. For example, the illuminant 101a such as a metal halide lamp and a high pressure mercury lamp has the brilliance distribution characteristic shown in FIG. 2.

In FIG. 2, reference characters 101d and 101e denote the electrodes of the illuminant 101a, Pd and Pe indicate emitting front points closed to the electrodes 101d and 101e, and Pf designates the center point of the emitting front points Pd and Pe.

As previously described, the center point Pf is equal to the parabolic focus of the lamp reflector 101b. Reference number 104 designates the brilliance distribution of the illuminant 101a shown in contour lines.

The brilliance distribution 104 is shown using the relatively brilliance values 10–90 every 10. The distance d shown in FIG. 2 is called an arc length that is one of indexes of the performance of the lamp 101. That is, the arc length d is an approximation parameter indicating the degree of the similarity between the actual illuminant 101a and an ideal point light source.

When the magnitude of the arc length d is smaller as low as possible, the front points Pd and Pe of the electrodes 101d and 101e become closer to the center point Pf, so that the illuminant 101a becomes closer to the ideal point light source. Thus, the illuminant 101a has the illuminant of a finite size defined by the arc length d. When AC or DC voltage is supplied to the electrodes 101d and 101e, the light is emitted from the space between the electrodes 101d and 101e according to the brilliance distribution 104. As can be understood from FIG. 2, the maximum brilliance of a relative brilliance value of approximately 90 is obtained at the front points Pd and Pe of the electrode 101d and 101e.

The relative brilliance value 50–60, which is slightly smaller than the maximum brilliance value, is obtained at the center point Pf. The relative brilliance value is gradually decreased to the value 10 according to increasing of the distance from the front points Pd and Pe.

Thus, the point where the maximum brilliance value is obtained is the front point Pd or Pe which is shifted from the center point Pf by half of the arc length d. That is, the brilliance value obtained at the center point Pf, namely at the parabolic surface focus of the lamp reflector 101b is not the maximum brilliance value.

FIG. 3 is a diagram showing the orientation distribution characteristic of the illuminant 101a, where reference number 105 indicates an orientation distribution. In FIG. 3, the center point Pf of the illuminant 101a is the orientation O, and the forward direction of the optical axis Z is defined as the radiation angle of zero, and the clockwise direction on a sheet is the direction from zero to 360 degrees. In FIG. 3, a luminous intensity is indicated every 20 degrees from zero to 100 around the origin O in direction of a constant radiation angle. In this case, for example, a point far from the origin O has a weak luminous intensity and the luminous intensity of the origin O is zero. When the luminous intensity is measured on an optional plane including the optical axis z shown in FIG. 1, the orientation distribution shown in FIG. 3 is obtained.

The orientation distribution 105 shows the higher luminous intensity of not less than 80 at two ranges of the radiation angles 60–120 and 240–300. On the other hand, the orientation distribution 105 shows the lower intensity of light at two ranges of angles of approximately ±50 around zero and around 180. This means that the electrodes 101a and 101b are placed in the illuminant 101a, and the light is cut by shadows of the electrodes 101d and 101e at approximately ±50 around zero and around 180, as shown in FIG. 2.

A description will now be given of the operation of the condensing optical system shown in FIG. 1.

The greater part of lights emitted from the illuminant 101a is reflected by the lamp reflector 101b. As shown in FIG. 2, because the illuminant 101a has the luminous of a finite size designated by the arc length d, the reflected lights from the lamp reflector 101b become approximately in parallel to the optical axis Z. This light flux of the approximate parallel lights goes toward the forward direction of the optical axis Z through the lamp front glass 101c. As has been previously described regarding the orientation distribution characteristic shown in FIG. 3, the dead zone D is present where there is no light because of the shadow of the electrodes 101d and 101e.

The output light from the lamp 101 is condensed to the lens focus after refracting it by the condenser lenses 102a and 102b, input to the incident surface of the rod integrator 103, and then transmitted through the inside of the rod integrator 103, as shown in FIG. 4.

FIG. 4 is a diagram showing an optical path of the transmitted light through the inside of the rod integrator 103. In FIG. 4, reference characters 103a, 103b, and 103c designate an incident plane, a side surface, and an outgoing plane of the rod integrator 103, respectively. Both the incident plane 103a and the outgoing plane 103b are perpendicularly intersected to the optical axis Z.

The condenser lenses 102a and 102b are so designed that the incident light through the incident plane 103a is totally reflected at the side surface 103b of the rod integrator 103. The incident light through the incident plane 103a is therefore totally reflected repeatedly at the side surface 103b and finally output through the outgoing plane 103c. Because the rod integrator 103 uses the phenomenon of the total reflection, there is no leaking of light through the side surface 103b and no loss in the rod integrator 103.

At this time, because the lights from the condenser lenses 102a and 102b are input into the incident plane 103a at various incident angles, an illumination distribution of the lights after performing the total reflection repeatedly at the side surface 103b becomes approximately uniform at the outgoing plane 103c.

FIG. 5A and FIG. 5B are diagrams showing the illumination distribution characteristic of the incident light and the outgoing light of the rod integrator 103. In FIGS. 5A and 5B, an axis parallel to the optical axis Z shows the illumination of the outgoing light.

The rod integrator 103 has the function to convert the incident light having the illumination distribution like Gauss distribution (see FIG. 5A) into the outgoing light having a uniform illumination distribution (see FIG. 5B).

The lights of the uniform illumination distribution made by the rod integrator 103 are transferred by the following optical system. For example, in an image display device using an optical modulation element such as a DMD chip (digital micro mirror device which-is a trade mark of Texas Instrument Incorporated (TI)) or a crystal liquid panel, the outgoing lights from the rod integrator 103 are irradiated to the optical modulation element through a relay optical system in order to obtain image information. The lights with the image information are projected onto a screen through a projecting optical system, so that the image based on the image information is displayed on the screen.

Because of the configuration described above, the conventional lamp involves a drawback to increase the divergent angle of the outgoing light flux after the lamp reflector reflects the lights from the illuminant.

Furthermore, because of the configuration described above, the conventional image display device involves a drawback to decreases the brightness of the image to be projected on the screen by a leaking loss generated at the incident plane of the rod integrator.

Furthermore, because of the configuration of the conventional image display device described above, there is a drawback to decreases the brightness of the image to be projected on the screen by the leaking loss generated at the incident plane of the rod integrator.

A description will now be given of the explanation for each of the above conventional drawbacks.

In FIG. 1, when the illuminant 101a is an ideal point light source in geometry, lights emitted by the illuminant 101a become completely parallel lights after the reflection by the lamp reflector 101b. Because the parallel lights are condensed into the lens focus by the condenser lenses 102a and 102b and then transmitted into the incident plane 103a of the rod integrator 103.

In this case, because all of the parallel lights are condensed into the lens focus by the condensing lenses 102a and 102b, and then input into the incident plane 103a of the rod integrator 103, there is no leaking loss of the lights caused at the incident plane 103a excepting a reflection loss in the lamp reflector 101b and a light transmission loss through the condenser lenses 102a and 102b.

However, as has been explained using FIG. 2, because the illuminant 101a has a light source of a size defined by the arc length d, it is not the ideal point light source. Accordingly, the illuminant image of a finites size is generated at the incident plane 103a of the rod integrator 103 because the light distribution at the incident plane 103a is not condensed into the lens focus.

FIG. 6 is a diagram showing the explanation for the image of the illuminant 101a appeared at the incident plane 103a of the rod integrator 103. In FIG. 6, the center point Pf is selected as a reference point. The center point Pf is equal to the front points Pd and Pe having the maximum brilliance and the parabolic focus Pf shown in FIG. 2. FIG. 6 shows the state to condense the lights 106d and 106e, and 106f transmitted from those points Pd, Pe, and Pf into the incident plane 103a.

In this case, we will pay an attention to one point 101z on the lamp front glass 101c and each light passing through this point 101z. The light 106f passing through the point 101z, which is in the outgoing lights from the center point Pf, is reflected at the lamp reflector 101b and then becomes the parallel light to the optical axis Z, and travels vertically to the point 101z on the lamp front lens 101c. This light is transmitted into the incident plane 103a by the condenser lenses 102a and 102b according to the design without any leaking of light.

On the other hand, because the points Pd and Pe are not on the parabolic focus, the lights 106d and 106e passing through the point 101z in the light flux from the front points Pd and Pe become non parallel lights to the optical axis Z at the point 101z. In this case, when the lamp front glass 101c is recognized as a virtual plane light source, it is defined that this light source generates lights having the maximum divergent angle at the point 101z around the parallel light 106f as the center, such as the lights 106d and 106e.

Because the inclined light components have an angle which is out of the design, when the lights are condensed into the incident plane 103a by the condenser lenses 102a and 102b, many of the lights are out of the sectional area of the incident plane 103a.

In this case, the lights generated at each point between the electrodes 101d and 101e around the center point Pf are not condensed to the lens focus completely. This forms an illuminant image whose size is larger in area than the sectional area of the incident plane 103a.

FIG. 7 is a diagram showing the result of quantitative analysis of the receiving of the lights 106d, 106e, and 106f at the incident plane 103a. FIG. 7 is a diagram showing the relationship between the outgoing position of the outgoing light from the lamp front glass 101c and the incident position of the incident light to the incident plane 103a.

In FIG. 7, the horizontal axis represents the position through which the light is output from the lamp front glass 10c, which has a distance R measured from the optical axis Z show in FIG. 6. The vertical axis designates the position through which the light is input into the incident plane 103a, which has a distance Ri measured from the optical axis Z shown in FIG. 6.

In this analysis, the lamp 101 has the arc length d=1.3 [mm], the aperture diameter 75[mm] of the lamp reflector 101b, and the sectional area 5×6.5 [mm²] of the incident plane 103a. The condenser lenses 102a and 102b focus the light to the incident plane 103a with F value=1.

The line Ri=±2.5 [mm] indicated by the reference characters 107a and 107b shown in FIG. 7 represents the boundary of the incident plane 103a and the region |Ri|≦2.5 [mm] corresponds to the size of the incident plane 103a.

Because the incident position of the light 106f to the total outgoing range of R=0–37.5 [mm] becomes |Ri|<approximately 1.5 [mm], it is understood that the light 106f is always input into the incident plane 103a.

In addition, the lights 106d and 106e are in the boundary 107a–107b of the incident plane 103a within the outgoing range of R=approximately 20–37.5 [mm] which is greatly apart from the output axis Z. Therefore no leaking of the input light occurs within the outgoing range, and there occurs no loss of the leaking light.

On the contrary, the lights 106d and 106e are out of the boundary 107a–107b in the outgoing range relatively close to the optical axis Z of not more than R=approximately 20 [mm]. That is, the loss Ld of the light 106d occurs within the outgoing range of R=approximately 6–19 [mm], and the loss Le of the light 106e occurs within the outgoing range of R=approximately 2–12 [mm]. Then, the lights 106d and 106e enter again in the range of the boundaries 107a–107b in the outgoing range R=approximately 0–2 [mm] which is mostly close to the optical axis Z.

This case includes a serious problem that the luminous intensity in the losses Ld and Le are greater than other areas. The reason is as follows. FIG. 8 is a diagram showing the luminous intensity distribution of the outgoing light from the lamp front glass 101c. Similar to the case shown in FIG. 7, the horizontal axis indicates the distance R measured from the optical axis and the vertical axis represents the relative luminous intensity (Illumination×a very short ring-shaped area) of the outgoing light.

As clearly understood from FIG. 8, for example, the range of the outgoing light having the relative luminous intensity of approximately not less than 0.5 is R=approximately 7–23 [mm] (it occurs similar at the minus side of R.)

It can be understood that the volume zone V having the large luminous intensity of the lamp 101 nearly corresponds to the outgoing ranges R=approximately 6–19 [mm] and R=approximately 2–12 [mm] of the losses Ld and Le (previously shown). That is, the light in the volume zone V having the maximum luminous intensity can not be input to the incident plane 103a, namely becomes a loss.

In order to solve the above problems, it can be recognized to enlarge the size of the incident plane 103a. However, considering a viewpoint of the yield rate of the manufacture, it is quite advantageous to use photo modulation elements such as DMD chips and liquid crystal panels have a small incident area to input lights. Further, because the size of the incident plane 103a of the rod integrator 103 becomes small in proportional to the size of the photo modulation element from a view point of magnification of lenses, the above method cannot easily solve this problem.

SUMMARY OF THE INVENTION

The present invention has been made to solve the above drawbacks of the conventional lamp and the conventional condensing optical system using the conventional lamp.

It is therefore an object of the present invention to provide a lamp for outgoing a light flux having a suppressed divergent angle.

Moreover, it is another object of the present invention is to provide a condensing optical system capable of reducing losses caused at the incident plane of a rod integrator by reducing the spreading of an illuminant image at a lens focus of a condenser lens.

Still furthermore, it is another object of the present invention is to provide an image display device capable of improving a brightness of an image projected on a screen by reducing losses caused at the incident plane of the rod integrator.

In a lamp according to the present invention, a paraboloid of revolution of a lamp reflector is formed by a deformation of an aspherical reflection surface which is in symmetry of rotation to the optical axis. At least one of the incident plane and the outgoing plane of the lamp front glass is formed by a deformation of an aspherical lens surface which is in symmetry of rotation to the optical axis. The light flux is collimated to the parallel light flux traveling from the illuminant toward its irradiation direction by applying corresponding power which is different in light flux in order to control a distribution of a divergent angle at the outgoing plane of the lamp front glass.

A polarizing conversion optical system according to the present invention has the lamp of the present invention, a lens array, and a polarization conversion element. The lens array has a plurality of lenses arranged in array for condensing outgoing lights from the lamp. The polarization conversion element has a plurality of polarizing beam splitters arranged in array placed near a lens focus of the lens array, and outputs the flux of the outgoing lights output from the lamp front glass after orthogonal polarized components included in the outgoing lights are coincided to each other.

A condensing optical system according to the present invention has the lamp according to the present invention, a condenser lens group, and a rod integrator. The condenser lens group condenses outgoing lights from the lamp into a lens focus. The rod integrator receives its incident plane condensed at the lens focus and outputs the light fluxes through its outgoing surface after repeated operations of a total reflection at a side surface of the rod integrator.

An image display device according to the present invention has the polarizing conversion optical system according to the present invention, an optical modulation element, an integrator optical system, a projecting optical system, and a screen. The optical modulation element receives incident lights from the polarization converting optical system, gives them image information, and outputs light flux with the image information. The integrator optical system overlaps and outputs the light flux from the polarization converting optical system to the incident surface of the photo modulation element. The projecting optical system projects the light flux with the image information transmitted from the photo modulation element. The screen receives the light flux projected by the projecting optical system, and displays the image based on the light flux with the image information.

An image display device according to the present invention has the condensing optical system according to the present invention, a relay optical system, an optical modulation element, a projecting optical system, and a screen. The relay optical system relays lights from the condensing optical system. The optical modulation element gives image information the lights from the relay optical system, and outputs the lights with the image information. The projecting optical system projects the lights with the image information from the optical modulation element. The screen receives the lights projected by the projecting optical system, and displays the image based on the image information.

BRIEF DESCRIPTION OF THE DRAWINGS

Other objects, features and advantages of the present invention will become apparent from the following description taken in conjunction with the accompanying drawings, in which:

FIG. 9 is a diagram showing a configuration of a condensing optical system to which a lamp of a first embodiment of the present invention is applied;

DETAILED DESCRIPTION OF THE PREFERRED EMBODIMENTS

Figure 1:
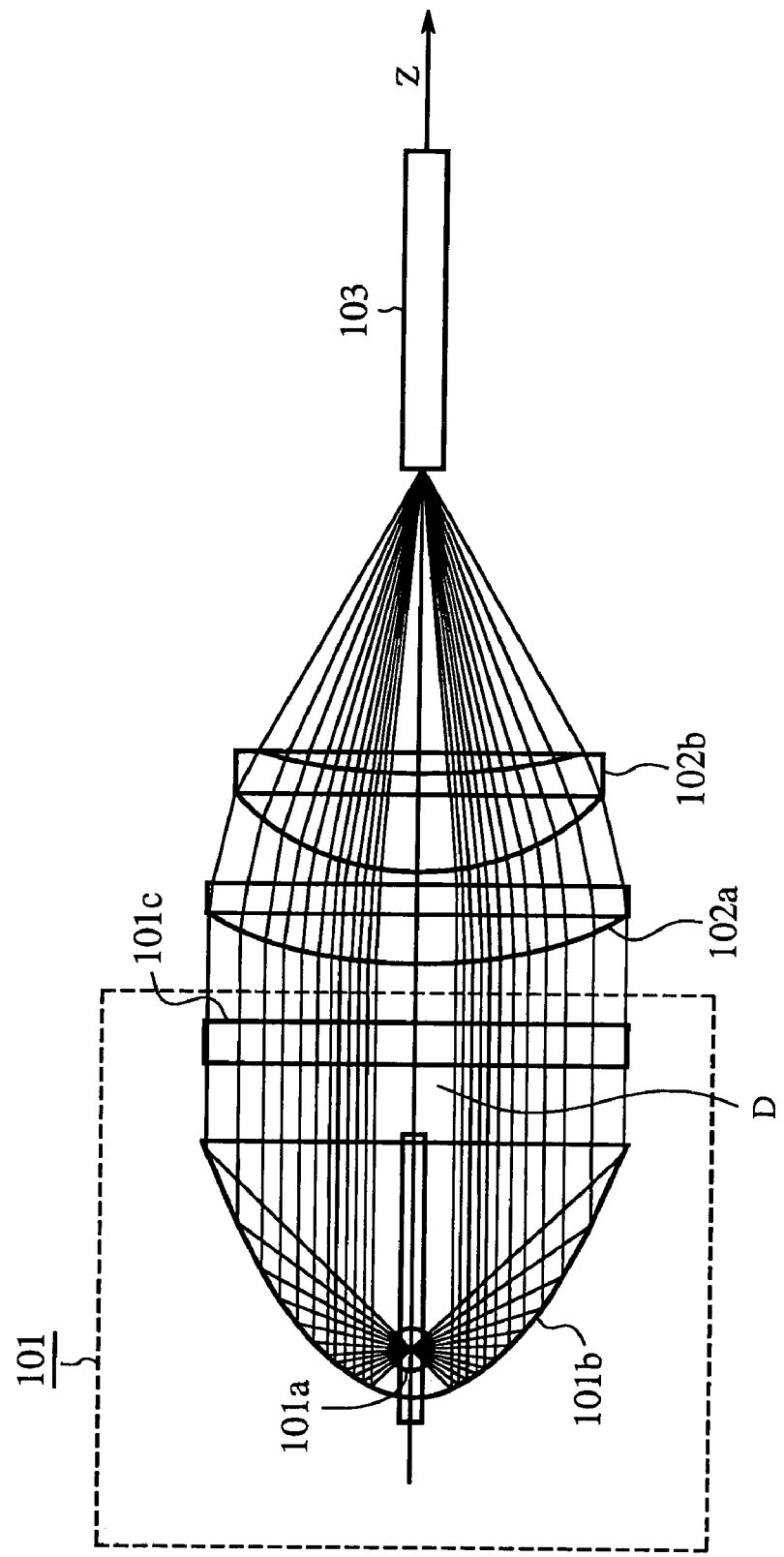
FIG. 1 is a diagram showing a configuration of a condensing optical system using a conventional lamp.

A detailed description will be given, with reference to the accompanying drawings, of the preferred embodiments of the present invention.

First Embodiment

FIG. 9 is a diagram showing a configuration of a condensing optical system to which the lamp according to a first embodiment of the present invention is applied. FIG. 9 shows a sectional view of the condensing optical system which is cut by an optional plane including an optical axis. In FIG. 9, reference number 1 designates a lamp, reference character 1a denotes an illuminant, 1b indicates a deformed lamp reflector, and 1c designates a lamp front glass. The lamp 1 of the first embodiment comprises the illuminant 1a, the deformed lamp reflector 1b, and the lamp front lens 1c.

The illuminant 1a is so formed that electrodes are placed at the center of the bulb of the lamp 1. The lights are generated in and emitted from the space between the electrodes. The light source of the illuminant 1a is between the electrodes. The illuminant 1a is equal in configuration to the illuminant 101a of the prior art technique. The illuminant 1a has the brilliance distribution characteristic shown in FIG. 2 and the orientation distribution characteristic shown in FIG. 3.

The deformed lamp reflector 1b as a feature component of the lamp 1 is so designed that the light from the illuminant 1a is reflected by the aspheric reflection surface of the deformed lamp reflector 1b and the reflected light is output to the outside through the aperture of the deformed lamp reflector 1b.

The aspheric reflection surface of the deformed lamp reflector 1b is a concave mirror obtained by rotating a plane curve represented by a polynominal around its rotation axis (optical axis). That is, the aspheric reflection surface has a shape approximately similar to a paraboloid of revolution.

The lamp front lens 1c as one feature element of the lamp 1, just like the deformed lamp reflector 1b, is an aspheric surface lens which is symmetrical about the rotation axis (optical axis). This lamp front lens 1c is so formed that it covers the aperture of the deformed lamp reflector 1b. This configuration can protect persons and other components from the occurrence of a burst of the illuminant 1a which rarely occurs, and acts as the lens to the reflected 573 light from the deformed lamp reflector 1b.

The lamp front lens 1c shown in FIG. 9 is a one side aspheric surface lens in which a concave-convex lens surface is formed only on the incident plane for the reflected light from the deformed lamp reflector 1b. However, the present invention is not limited by this configuration. For example, it is acceptable to use a one side aspheric lens in which the lens surface is formed on the outgoing surface, or to use a both side aspheric lens in which the lens surface is formed on both the incident surface and the outgoing surface, according to applications.

Reference characters 2a and 2b denote a spherical lens called "a condenser lens" (condenser lens group).

The condenser lenses 2a and 2b have the function to condense the outgoing light from the lamp front surface lens 1c into its focus (hereinafter referred to as "lens focus") In general, each of the condenser lenses 2a and 2b is made up of a plurality of lenses in order to suppress an aberration.

Reference number 3 designates a column-shaped glass called "rod integrator" in which the light received at the incident plane 3a is totally reflected repeatedly at the side wall 3b while passing through the inside of the rod integrator 3, and the light is finally output through the outgoing surface 3c. In order to increase the receiving efficiency of light, namely, to increase the amount of the received light through the incident plane 3a as many as possible and to decrease a loss, the incident plane 3a of the rod integrator 3 is placed at the lens focus of the condenser lenses 2a and 2b.

The line Z connecting the center of the illuminant 1a, the center of the condenser lenses 2a and 2b, and the center of the incident plane 3a of the rod integrator 3 is an optical axis. This optical axis Z coincides with the rotation axis of the deformed lamp reflector 1b and the rotation axis of the lamp front lens 1c.

The forward direction of the optical axis Z takes the forward direction of the light.

The condensing optical system according to the first embodiment comprises the lamp 1, the condenser lenses 2a and 2b, and the rod integrator 3.

A description will now be given of the operation of the condensing optical system of the first embodiment.

As has previously been described, the illuminant 1a emits lights based on the brilliance distribution characteristic and the orientation distribution characteristic, just like the conventional one.

Most of the lights emitted by the illuminant 1a are reflected by the aspheric reflection surface of the deformed lamp reflector 1b and the reflected lights travel toward the forward direction of the optical axis Z.

The reflected lights by the deformed lamp reflector 1b outgo through the lamp front lens 1c, the main light thereof becomes in parallel to the optical axis Z.

In the conventional lamp 101 previously described, the divergent angle of the outgoing light from the lamp front glass 101c is changed according to the distance measured from the optical axis Z. On the contrary, in the lamp 1 of the present invention the divergent angle of the outgoing light from the lamp front lens 1c is not changed, namely constant, regardless of any change of the distance from the optical axis Z.

The outgoing light from the lamp front lens 1c is refracted by the condenser lenses 2a and 2b, focused at the lens focus, input into the incident plane 3a of the rod integrator 3, and transmitted through the inside of the rod integrator 3.

Figure 4:
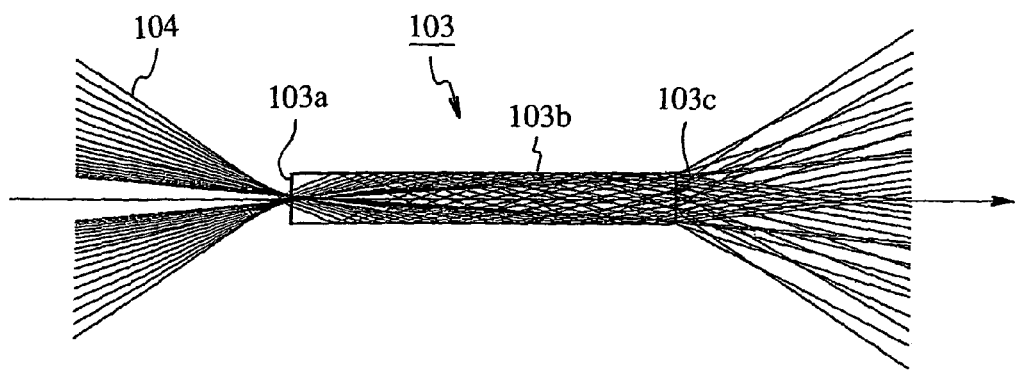
FIG. 4 is a diagram showing an optical path of a transmitted light through a rod integrator.

Because the condenser lenses 2a and 2b are so designed that the incident lights input into the incident plane 3a are totally reflected at the side wall of the rod integrator 3, the incident lights through the incident plane 3a are totally reflected repeatedly at the side wall 3b of the rod integrator 3, and the reflected lights are then output through the outgoing surface 3c to outside of the rod integrator 3, like the conventional case shown in FIG. 4.

Figure 5A:
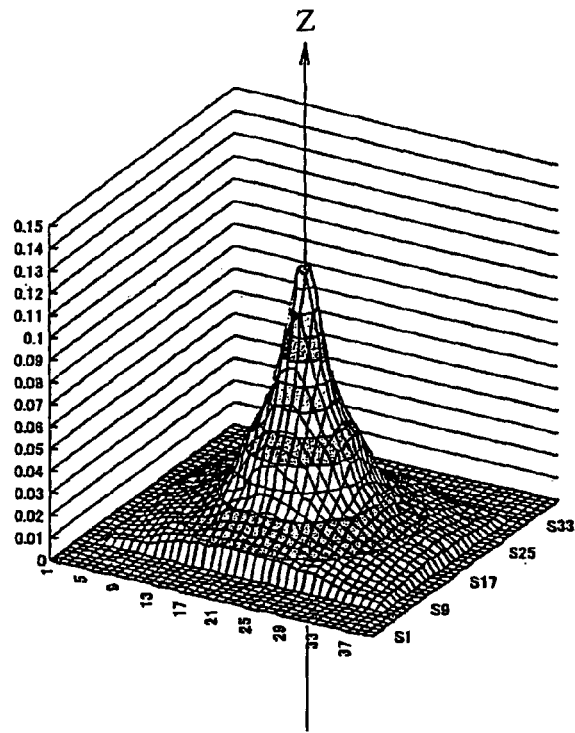
FIGS. 5A and 5B are diagrams showing illumination distribution characteristics of incident light and outgoing light of the rod integrator.
Figure 5B:
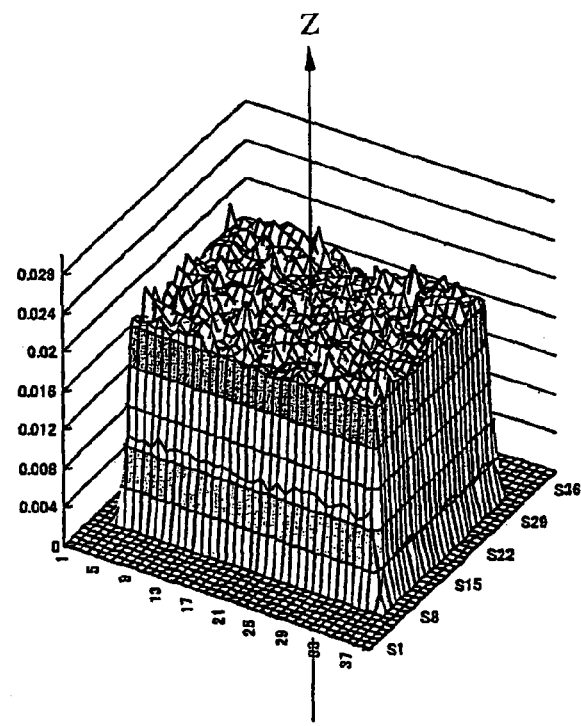

Because the function of the total reflection is used, there is no light leaking through the side wall 3b and this causes no loss in the rod integrator 3. Because the lights from the condenser lenses 2a and 2b are input into the incident surface 3a with various incident angles, the illumination distribution of the reflected lights becomes approximately uniform at the outgoing surface 3c, like the conventional one shown in FIG. 5B.

The lights of the uniform illumination distribution generated by the rod integrator 3 are transferred by the following optical system. For example, in a case of an image display device using a photo modulation element such as a DMD chip or a liquid crystal panel, the outgoing light from the rod integrator 3 irradiates the photo modulation element through the relay optical system, and the light thereby includes the image information by this image modulation element.

The lights including the image information are projected on a screen through a projecting optical system, so that the image is displayed on the screen according to the image information.

Next, a description will now be given of the concrete feature of the lamp 1 of the first embodiment.

Figure 10A:
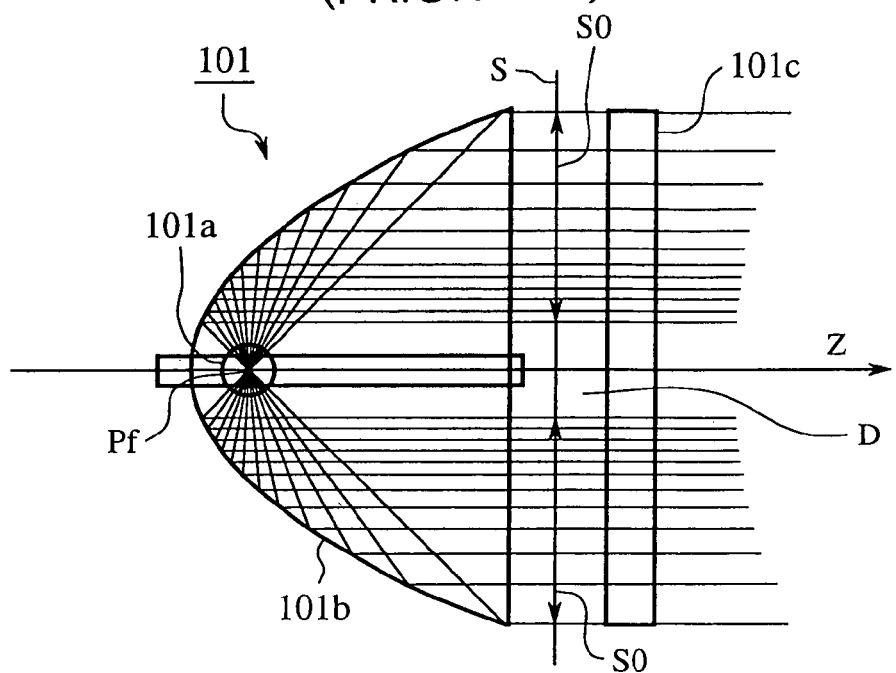
FIGS. 10A and 10B are diagrams to compare the lamp of the first embodiment with the conventional lamp.
Figure 10B:
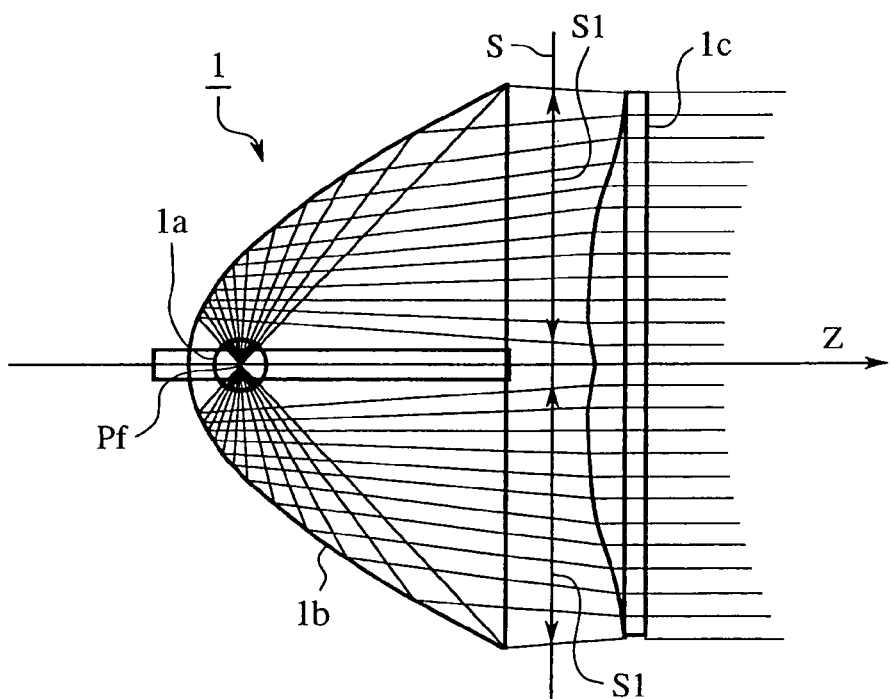

FIGS. 10A and 10B are diagrams to compare the lamp 1 of this embodiment with the conventional lamp 101. FIG. 10A shows the case of the conventional lamp 101 and FIG. 10B shows the case of the lamp 1. In FIG. 10A and FIG. 10B, the same components in the configurations shown in FIG. 9 and FIG. 1 are referred to with the same reference numbers and characters.

FIG. 10A and FIG. 10B show the optical light flux group emitted from the center point Pf of each of the illuminants 1a and 101a every a same radiation angle, respectively.

The plane designated by the reference character S is a virtual plane perpendicular to the optical axis Z in order to explain the shape of the reflection plane of the aspheric reflection surface of the lamp reflector 1b.

In the conventional lamp 101 shown in FIG. 10A, the light flux emitted every same radiation angle from the center point Pf of the illuminant 101a is reflected by the paraboloid of revolution and converted to a parallel light flux which is in parallel to the optical axis Z. This parallel light flux travels through the plane-shaped lamp front glass 101c and goes in the forward direction of the optical axis Z.

In the case of FIG. 10A, even if the position of the virtual plane S on the optical axis Z is shifted toward the forward direction, there is no change of the sectional area SO in the virtual plane S through which the parallel light flux passes.

The distribution of the parallel light flux at the sectional area S0 is not uniform, namely, the distribution of the parallel light flux close to the area of the optical axis Z becomes condensation, and the distribution of the parallel light flux in the area apart from the optical axis is gradually rarefaction.

In general, when the light source having a finite magnitude is collimated, the collimated lights output from the focus of the collimator lens become completely in parallel to each other, but the lights from the positions other than the focus have divergent components. In this case, even if the same light source is used, the divergent angle of the collimated light becomes large according to increasing of the power of the collimator lens, and divergent angle becomes small according to decreasing of the power of the collimator lens.

By the way, in the case of the conventional lamp 101, the paraboloid of revolution in the lamp reflector 101b has a larger power according to decreasing the distance form the optical axis Z, and has a smaller power according to increasing the distance from the optical axis Z.

When the above principle is applied to the action of the collimate of the lamp reflector, the light flux reflected in the area close to the optical axis of the paraboloid of revolution is output with a larger divergent angle according to the magnitude of the power.

The light flux reflected in the area apart from the optical axis Z of the paraboloid of revolution is output with a smaller divergent angle according to the magnitude of the power.

Figure 11A:
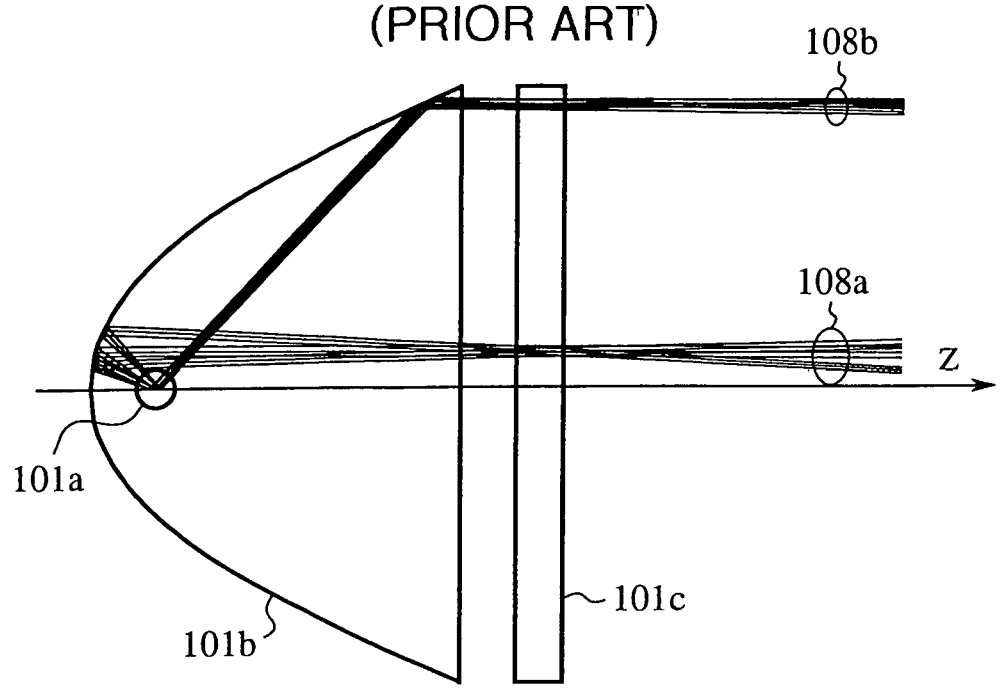
FIGS. 11A and 11B are diagrams to compare divergent angles of outgoing flux of the lamps of the first embodiment and the conventional lamp.

FIG. 11A shows the state of the light flux output from the lamp 101. FIG. 11A shows both two cases, one is that the light flux from the illuminant 101a is output as the light flux 108a which is close to the optical axis Z. The other is that the light flux from the illuminant 101a is output as the light flux 108b apart from the optical axis Z. When compared with the light flux 108b, it can be understood that the divergent angle of the light flux 108a becomes large.

In general, when the parallel lights are collected using a lens and the parallel lights inputting into the lens are in parallel to the optical axis of the lens, the parallel lights are collected to the lens focus, but, when the parallel lights inputting into the lens have an angle to the optical axis, the parallel lights are collected to a position that is shifted in a vertical direction to the optical axis. Thereby, the collecting points of the condenser lenses 102a and 102b spreads to a larger area around the center of the optical axis Z.

On the contrary, the condenser point to the light flux of a smaller divergent angle is collected into a small area around the center of the optical axis Z.

Figure 8:
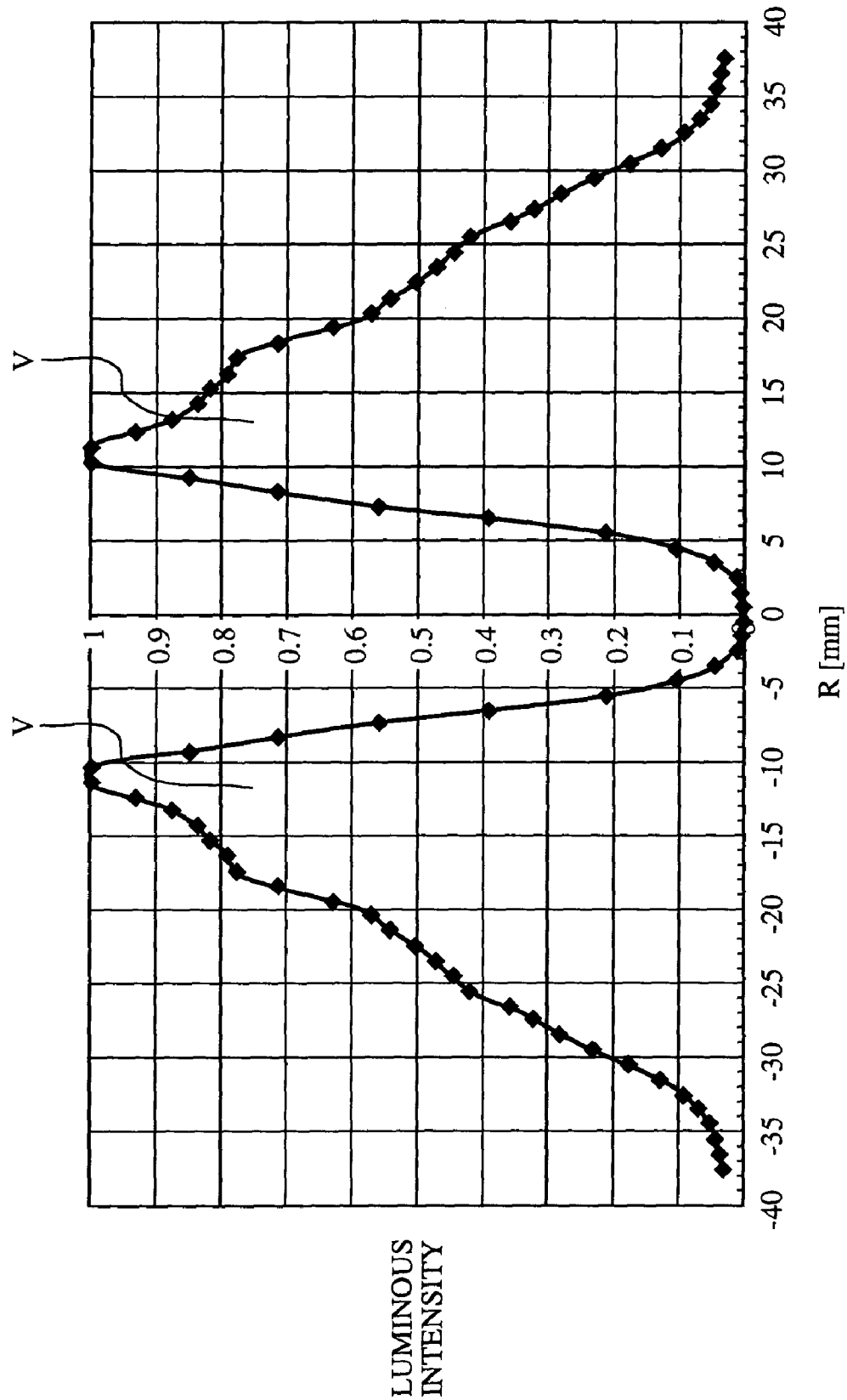
FIG. 8 is a diagram showing a luminous intensity distribution of the outgoing light of the lamp front glass.

As has previously been described in the explanation regarding the conventional problem, the area close to the optical axis Z of the lamp reflector 101b where the divergent angle of the reflected light is larger is an area at which the light in the volume zone V of the luminous intensity distribution characteristic shown in FIG. 8 is reflected. The area apart from the optical axis Z of the lamp reflector 101b where the divergent angle of the reflected light is smaller is an area at which the light of a lower luminous intensity is reflected. This is the main cause to decrease the amount of the incident lights at the incident plane 3a of the rod integrator 3.

The lamp 1 of the first embodiment of the present invention has a feature to increase the amount of lights at the incident plane 3a of the rod integrator 3 by improving the divergent angle of the outgoing light flux from the lamp 1.

In the lamp 1 shown in FIG. 10B, lights are collimated using a combination of the deformed lamp reflector 1b made up of the aspheric reflection surface and the lamp front lens 1c as an aspheric surface lens.

The aspherical reflection surface of the deformed lamp reflector 1b shown in FIG. 10B spreads the light fluxes that the light fluxes cover the dead zone D when the lights are emitted from the center position Pf with a uniform radiation angle, and the density of each light flux becomes uniform on the sectional area (passing sectional area) where the light flux reflected by the deformed lamp reflector 1b passes to the virtual plane S.

The dead zone D (circular area) occurred in the conventional lamp 101 is the area surrounded by parallel light fluxes reflected by the lamp reflector 101b around the optical axis Z. There is no parallel light flux at the area in the dead zone. That is, the dead zone Z is the area where there is no outgoing light even if the light from the illuminant 101a as the light source is reflected by the paraboloid of revolution of the lamp reflector 101b, and the dead zone D is a circle around the optical axis Z of the lamp front glass 101c.

On the other hand, the lamp front lens 1c acts so that the angle of the light reflected by the deformed lamp reflector 1b becomes parallel to the optical axis Z. Accordingly, each parallel light flux output from the lamp 1 has a uniform circular sectional area which is equal to the outgoing area of the lamp front lens 1c.

The collimator lens system made up of the deformed lamp reflector 1b and the lamp front lens 1c described above can output the light flux, emitted in an optional infinitesimal solid angle from the center point Pf of the illuminant 1a, whose outgoing sectional area becomes a constant.

This means that this collimator lens system has a constant power regardless of the radiation angle of the light flux. That is, the divergent angle of the outgoing light flux becomes uniform at an optional point.

Figure 11B:
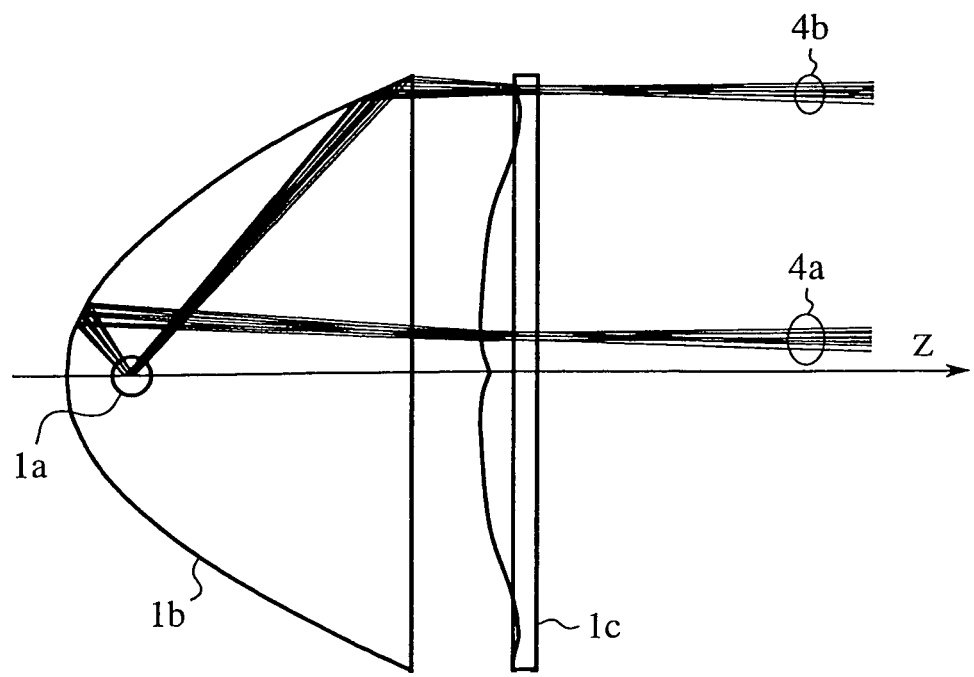

Further, because the deformed lamp reflector 1b spreads the light so that it covers the dead zone D, the collimator lens system can decrease its power of the dead zone D. This has the effect to suppress the divergent angle of the outgoing light. FIG. 11B shows the state of the outgoing light flux from the lamp 1.

FIG. 11B shows the two cases, one case is that the light flux from the illuminant 1a outputs as the light flux 4a close to the optical axis Z, and the other cases that the light flux from the illuminant 1a outputs as the light flux 4b apart from the optical axis Z. It can be easily understood that the divergent angle of the light flux 4a close to the optical axis Z is approximately equal to that of the light flux 4b apart from the optical axis Z.

Figure 6:
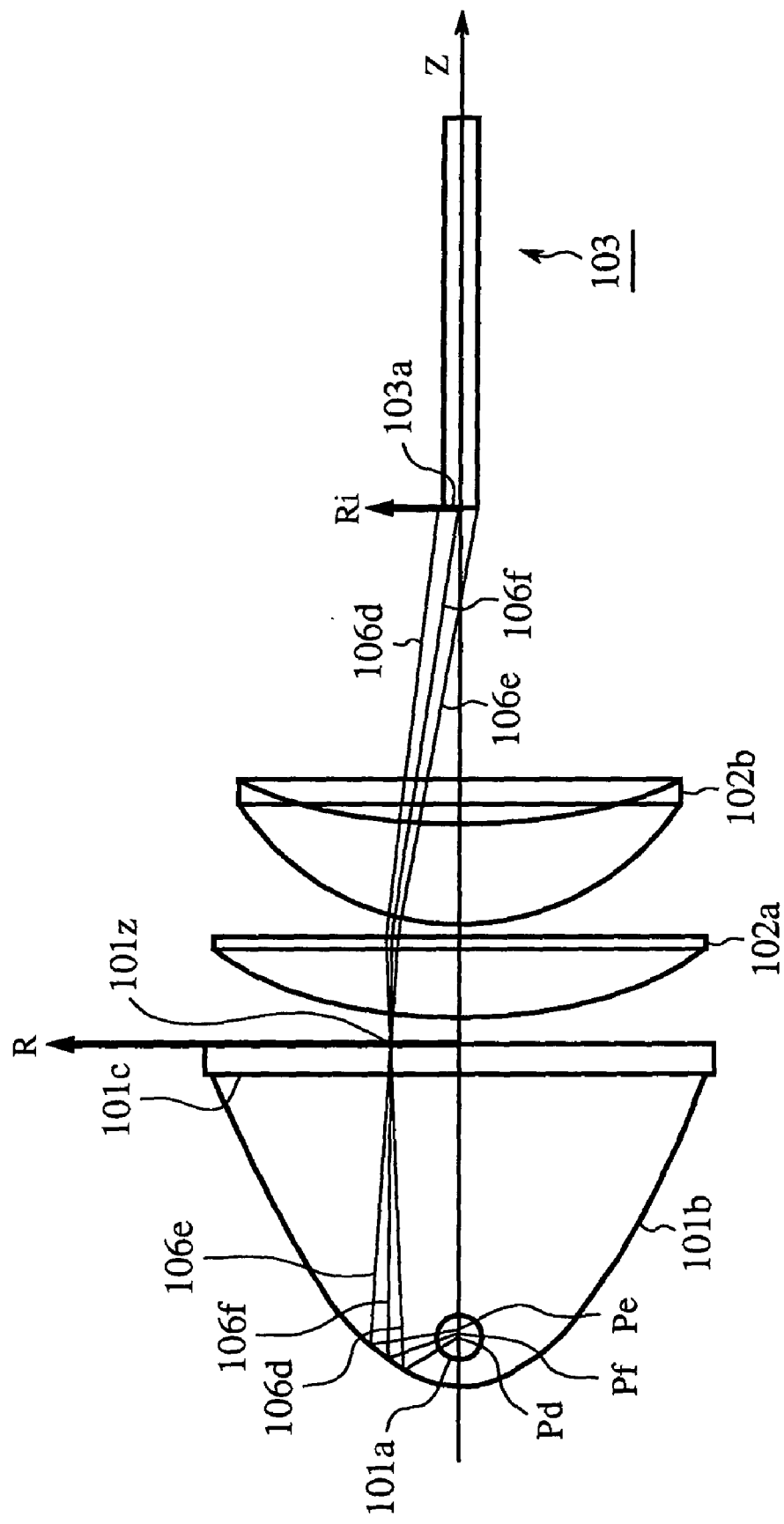
FIG. 6 is a diagram to explain the illuminant image generated on the incident plane of the rod integrator.
Figure 7:
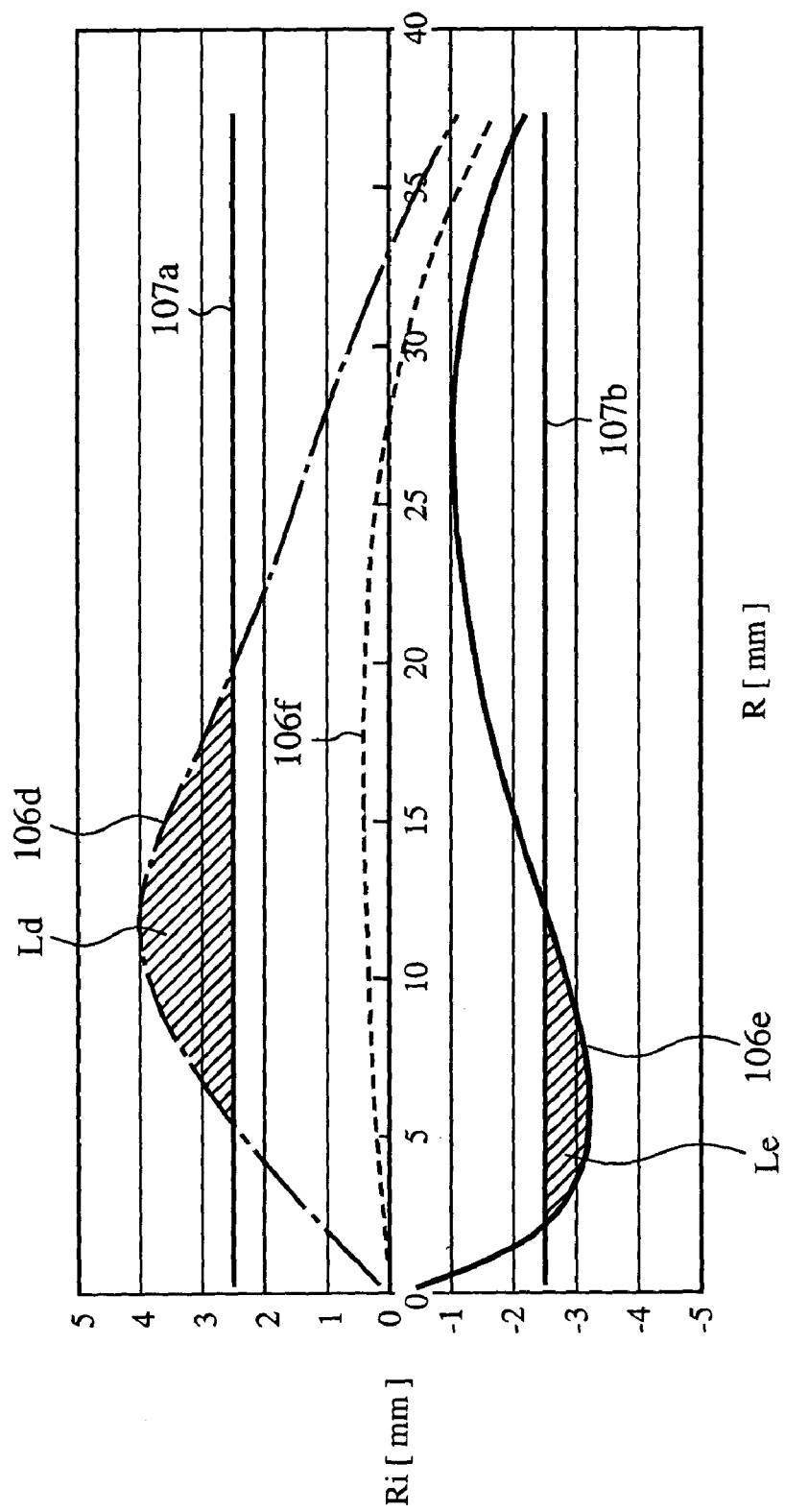
FIG. 7 is a diagram showing the relationship between an outgoing light position of a lamp front glass and a light incident position on the incident plane thereof.

A description will now be given of the result of the concrete analysis for the first embodiment, like the case of the conventional technique shown in FIG. 6 and FIG. 7.

Figure 12:
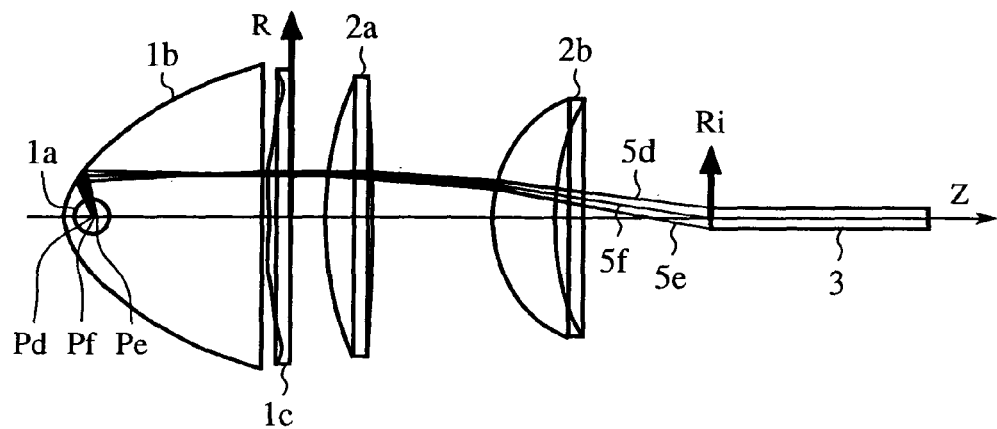
FIG. 12 is a diagram showing the outgoing position of the lamp front glass and the incident plane of the rod integrator.
Figure 13:
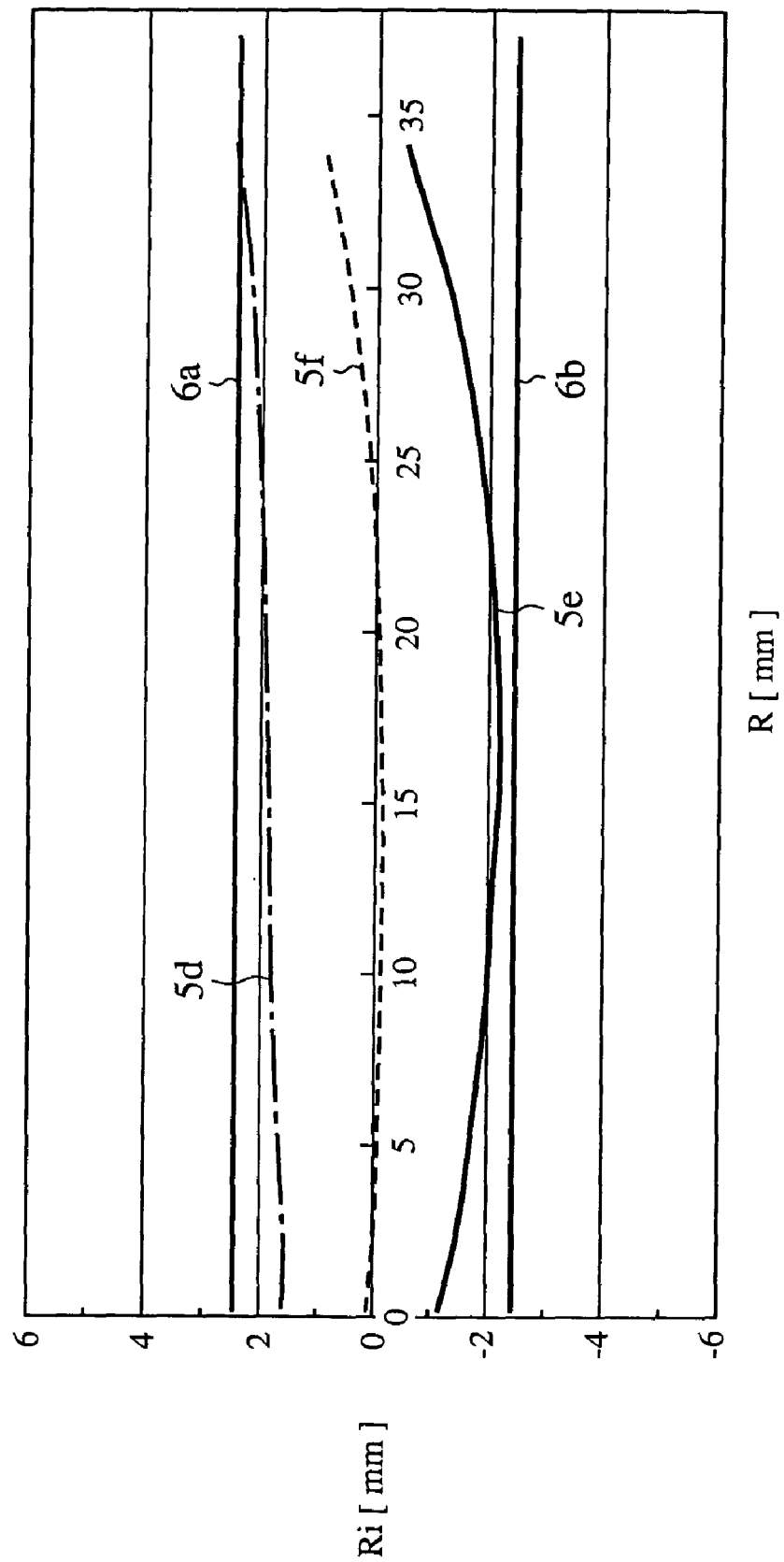
FIG. 13 is a diagram showing the relationship between the light outgoing position of the lamp front glass and the light incident position at the incident plane of the rod integrator.

FIG. 13 shows the result of the analysis of the incident-light position Ri to the incident plane 3a of the light fluxes 5d, 5e, and 5f emitted at the front points Pd and Pe close to the electrodes of the illuminant 1a, and the center point Pf thereof, where the outgoing position R of the light flux at the lamp front lens 1c is used as a parameter shown in FIG. 12.

FIG. 13 shows the relationship between the light outgoing position of the lamp front lens 1c and the light incident position of the incident plane 3a. FIG. 13 corresponds to the conventional case shown in FIG. 7. In FIG. 13, the same components of the case shown in FIG. 9 are referred to as the same reference numbers and characters.

In FIG. 13, the horizontal axis shows the outgoing position of the light flux from the lamp front lens 1c. This outgoing position is the distance R measured from the optical axis X shown in FIG. 12.

The vertical axis shows the position of the incident plane 3a of the rod integrator 3 to which the light flux is input. This position corresponds to the distance Ri measured from the optical axis shown in FIG. 12.

In this analysis, the light is condensed to the incident plane 3a by the condenser lenses 2a and 2b where the arc length d is 1.3 [mm] (d=1.3 [mm]), the aperture diameter is 70 [mm], and the sectional area of the incident plane 3a is 5×6.5 [mm$^2$].

The line Ri=±2.5 [mm] designated by the reference characters 6a and 6b shown in FIG. 13 shows the boundary of the incident plane 3a, and the area |Ri|≦2.5 [mm] corresponds to the size of the incident plane 3a.

Each of the outgoing light fluxes 5d, 5e, and 5f from the lamp 1 is completely set within the area from the intersection point of the optical axis Z of the lamp front lens 1c to the outside diameter of the outgoing surface of the lamp front glass 1c, that is, in the incident position |Ri|≦2.5 [mm] surrounded by the boundaries 6a–6b in the total outgoing range R=0–34 [mm].

Accordingly, there is no occurrence of the losses Ld and Le, contrarily to the conventional case, and the light fluxes are always input into the incident plane 3a.

In the position of the illuminant 1a to the deformed lamp reflector 1b, the direction of the arc length d of the illuminant 1a is coincided with the optical axis Z, and the aspheric reflection surface of the deformed lamp reflector 1b is designed as follows according to the brilliance distribution characteristic, the orientation distribution characteristic, the volume zone V, and various characteristics of the light emitted by the illuminant 1a, for example.

Figure 14:
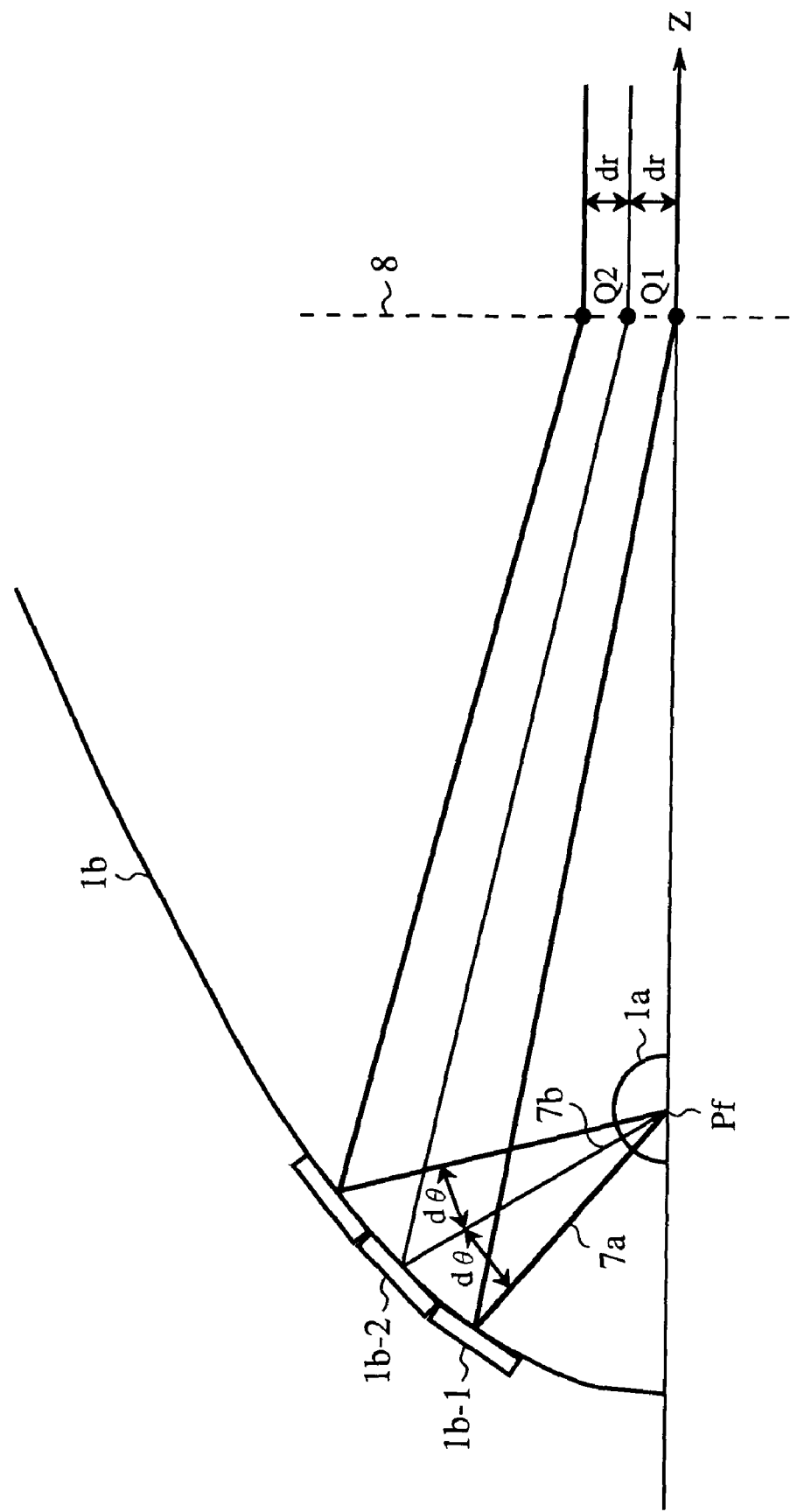
FIG. 14 is a diagram showing a design example of an aspheric reflection surface of a deformed lamp reflector to an illuminant.

FIG. 14 is a diagram showing a design example of the aspheric reflection surface of the deformed lamp reflector 1b to the illuminant 1a. In FIG. 14, just like the case of FIG. 9, the deformed lamp reflector 1b is cut by an optional plane including the optical axis Z. The same components in the case shown in FIG. 9 will be referred to with the same reference numbers and characters.

First, the setting position 8 of the lamp front lens 1c to the illuminant 1a on the optical axis Z is set.

Figure 3:
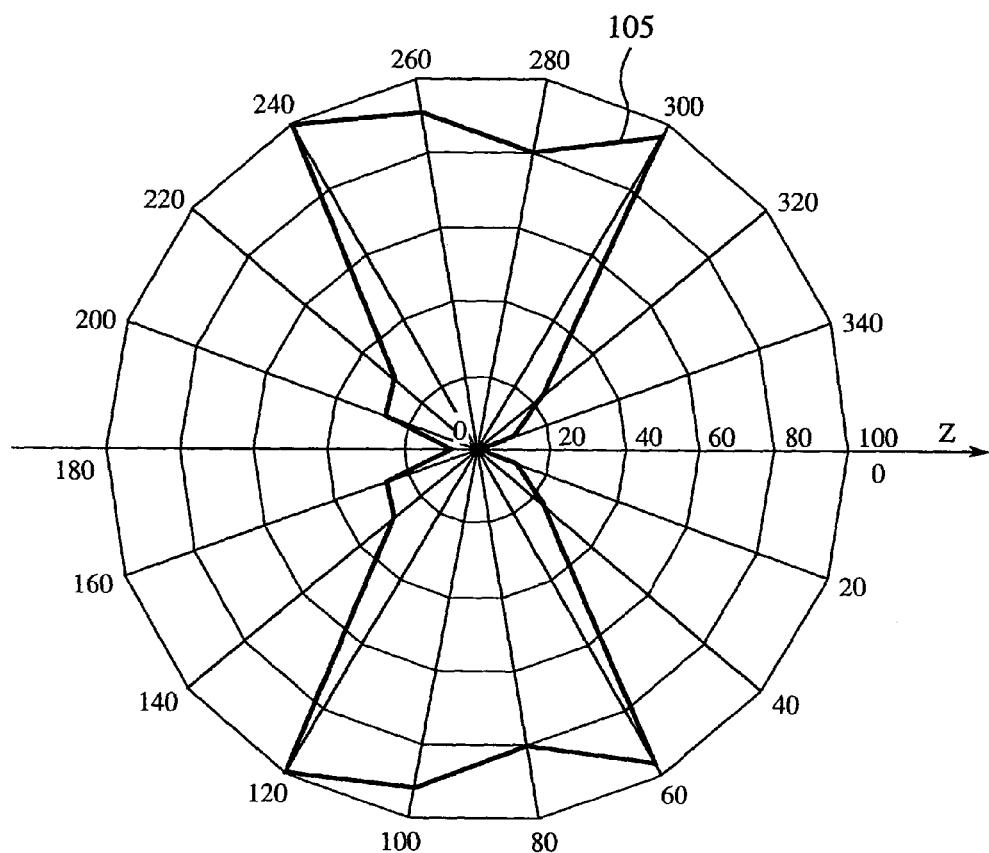
FIG. 3 is a diagram showing a typical orientation distribution characteristic of an illuminant.

Because the radiation direction of the light from the center position Pf of the illuminant 1a is determined as shown in FIG. 3, it takes the notice of the light 7a of the most outer radiation angle traveling toward the negative direction of the optical axis Z. An infinitesimal mirror 1b-1 is placed at the point where the reflection of the light occurs by the lamp reflector 101b of the conventional lamp 101. Because this infinitesimal mirror 1b-1 must reflect the light 7a toward the intersection Q1 which is at right angles to the optical axis Z at the setting point 8 of the lamp front lens 1c, the angle of the infinitesimal mirror 1b-1 to the optical axis Z is determined uniquely in FIG. 14.

Next, it will be considered that the light 7b is shifted to the light 7a by an infinitesimal angle dθ toward the forward direction of the optical axis, Z.

At the intersection on the extension of the line from the infinitesimal mirror 1b-1 previously described and the light 7b, the infinitesimal mirror 1b-2 is placed, which reflects the light toward the intersection Q2 which is shifted by an infinitesimal distance dr in the vertical direction to the optical axis Z from the intersection Q1 at which the position 8 of the lamp front lens 1b intersects the optical axis Z.

Like the infinitesimal mirror 1b-1, the angle of the infinitesimal mirror 1b-2 to the optical axis Z is uniquely determined.

While keeping always constant the infinitesimal radiation angle dθ and the infinitesimal distance dr, the above processes are repeatedly within all of the radiation angles of the light in order to form the infinitesimal mirror.

Although a ratio between the infinitesimal radiation angle dθ and the infinitesimal distance dr can be set optionally, in general, it is so set that the radius of the arrival point of the light of the most exterior angle at the lamp front lens 1c is approximately radius of the outgoing light flux of the lamp 101, where this light travels toward the forward direction of the optical axis Z from the center point Pf of the illuminant 1a.

While keeping constant the ratio between the infinitesimal radiation angle dθ and the infinitesimal distance dr, when both the values are small infinitely, the shape of the aspheric reflection surface of the deformed lamp reflector 1b is determined.

The shape of the aspherical lens surface of the lamp front lens 1c is designed so that each light is output in parallel to the optical axis Z by reflecting each light from the deformed lamp reflector 1b designed by the above manner.

Thus, the lamp 1 is so designed that the following conditions are satisfied. That is, according to the magnitude of the radiation angle of each light flux from the center point Pf of the illuminant 1a, the light flux reflected by the deformed lamp reflector 1b is input to the entire of the incident plane of the lamp front lens 1c so that each light does not intersect to each other. The incident light flux based on the lens function of the lamp front lens 1c is converted to the parallel light flux parallel to the optical axis Z and the converted one is output. Therefore the parallel light flux output from the lamp 1 has a circular sectional area which is equal to the outgoing surface of the lamp front lens 1c.

In FIG. 10A and FIG. 10B, although the light flux generated from the center point Pf with every equal radiation angle is distributed to the sectional area S1 uniformly as equal as possible, because the intensity of reflected light flux apart from the optical axis Z is low, for example, it is possible to suppress the divergent angle of the volume zone V by being nonuniformly the distribution of the light flux on the virtual surface S by increasing the sectional area of the light flux included in the volume zone V than the light flux of the area other than the volume zone V.

Further, because the definition of the volume zone V is not particularly limited, it is also possible to determine as the volume zone Z the area of a higher intensity of light rather than a threshold value which is set with an optional intensity of light larger than the luminous intensity of zero and smaller than the peak value.

Finally, a description will now be given of the explanation of one example of an image display device to which the condenser optional system of the first embodiment is applied.

Figure 15:
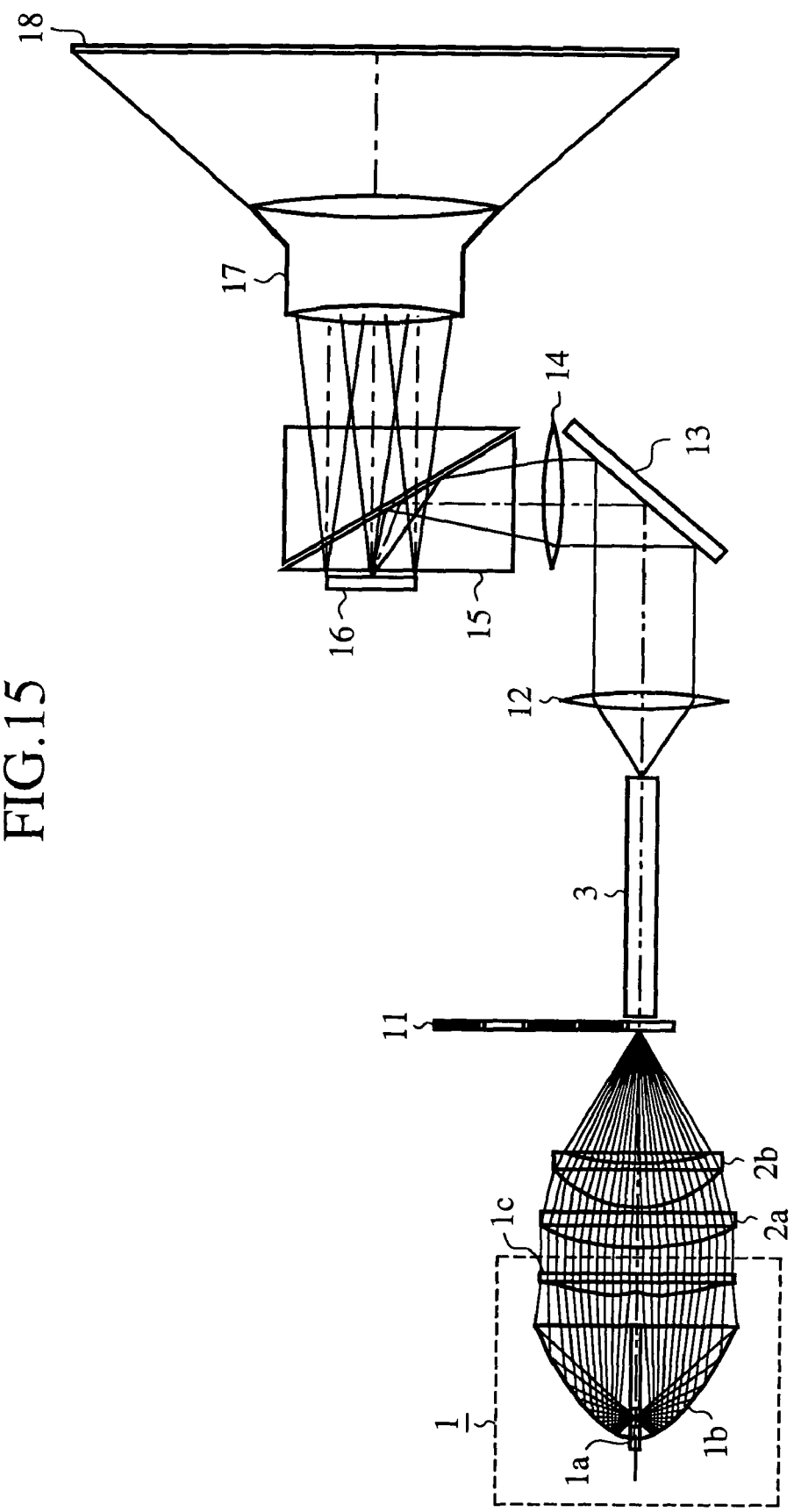
FIG. 15 is a diagram showing a configuration example of an image display system according to the first embodiment of the present invention.

FIG. 15 is a diagram showing an example of a configuration of the image display device of the first embodiment of the present invention. The same components in the case shown in FIG. 9 will be referred to with the same reference numbers and characters.

In FIG. 15, reference number 11 designates a color wheel to separate a light transmitted from the condensing optical system of the first embodiment into three primary colors. Reference number 12 denotes a relay lens (relay optical system) for relaying the light from the rod integrators 3, 13 indicates a reflected mirror (relay optical system) for reflecting the light path, and 14 designates a field lens (relay optical system) for aligning the direction of the main optical light at each point in the incident light flux.

The color wheel 11 is placed front the incident surface 3a or after the outgoing surface 3c of the rod integrator 3.

Reference number 15 indicates TIR prism (photo modulation element), 16 denotes a DMD chip (optical modulation element), 17 designates a projecting lens (projecting optical system) for focusing the modulated light in intensity from the DMD chip 16, 18 denotes a screen for receiving the light focused by the projection lens 17, on which the received image is displayed.

The TIR prism 15 performs the total reflection only for the incident light flux to the DMD chip 16 in order to prevent the leaking of the incident light flux by the incident section of the projecting lens 17. The TIR prism 17 also performs to pass the outgoing light flux from the DMD chip 16 into the projecting lens 17 without any reflection. That is, the TIR prism 15 has the function to separate the projecting optical system in configuration from the condensing optical system and the relay optical system.

Next, a description will now be given of the operation of the image display device of the first embodiment.

The condenser lenses 2a and 2b condense the outgoing light from the lamp 1 into its focus as a conical-shaped light flux of F value=1. Only the color selected by the color wheel 11 is selected from the conical-shaped condensed light flux. The selected one is input into the incident plane 3a of the rod integrator 3.

The light flux having an approximately uniform intensity with F value=1 is output from the outgoing surface 3c of the rod integrator 3, and then transmitted through the relay optical system made up of the relay lens 12, the reflection mirror 13, and the field lens 14. Finally, the light flux is input into the TIR prism 15.

The incident light flux of the TIR prism 15 is reflected by the internal section of the TIR prism 15 and then irradiated to the DMD chip 16. The DMD chip 16 gives the image information to the light flux based on digital image information and outputs it as the intensity modulated light flux. The intensity modulated light flux having the image information is transmitted through the TIR prism 15 again, and projected on the screen 18 through the projection lens 17.

Since the condensing optical system of the first embodiment is used as a light source in the image display device shown in FIG. 15, it is possible to improve the brightness of the image to be projected on the screen 18 when compared with the conventional image display device. The result of analysis indicates that it is possible to increase the brightness of the image approximately 1.1–1.2 times when compared with the conventional one. This can provide a greatly large improved effect. In addition, it is possible to only replace the lamp 1 of the present invention with the conventional lamp 101 while using the components in the conventional one other than the lamp 101.

It is thereby possible to improve the brightness of the image on the screen in the image display device of the present invention with a relatively small labor and cost.

The above case explains the image display device using the DMD chip 16 to which the condensing optical system is applied. The present invention is not limited by the above case, for example, it is possible to apply the condensing optical system to an image display device using a configuration other than that shown in FIG. 15 and to an image display device using the liquid crystal panel.

As described above, according to the first embodiment, the lamp 1 has the illuminant 1a, the deformed lamp reflector 1b, and the lamp front lens 1c. The deformed lamp reflector 1b having the aspherical reflection surface in symmetry of rotation is obtained by deforming the paraboloid of revolution of the lamp reflector 101b around the optical axis z. The lamp front lens 1c of aspheric lens surface in symmetric of rotation is obtained by deforming the incident plane of the lamp front glass 101c in symmetric of rotation to the optical axis Z. The light flux emitted from the center point Pf of the light source in the illuminant 1a is reflected by the deformed lamp reflector 1b, and then output through the lamp front lens 1c as the parallel light flux having a circle sectional area which is equal in area to the outgoing surface of the lamp front lens 1c. Accordingly, there is the effect it is possible to output the light flux of the suppressed divergent angle with the parallel light flux when compared with the conventional one.

In addition, according to the first embodiment, the lamp has the illuminant 1a, the deformed lamp reflector 1b, and the lamp front glass 1c. The illuminant 1a emits a light from the light source whose size is defined by an arc length "d" whose direction is coincided to the direction of the optical axis Z. The deformed lamp reflector 1b having the aspherical reflection surface which reflects the light emitted by the light source of the illuminant 1a toward the forward direction of the optical axis Z. The lamp front glass has the aspherical lens surface which refracts the light reflected by the deformed lamp reflector 1b and outputs the refracted one.

According to the magnitude of the irradiation angle between the light fluxes emitted from the center point Pf of the light source in the illuminant 1a and the optical axis Z, the deformed lamp reflector 1b reflects the light fluxes emitted from the center point Pf into the entire surface of the incident plane without intersecting the light fluxes to each other. The lamp front lens 1c refracts the light fluxes refracted by the deformed lamp reflector 1b at the aspheric lens surface, and outputs the light flux in parallel to the optical axis Z. There is thereby the effect that it is possible to output the light flux of the suppressed divergent angle with the parallel light flux when compared with the conventional one.

Further, according to the first embodiment, because it is so formed that the density of the light flux on the sectional area S1 from the center position Pf of the illuminant 1a becomes uniform, there is the effect that it is possible to output all of the light fluxes from the illuminant 1a with approximately uniform divergent angle regardless of the outgoing light position on the lamp front lens 1c.

Still further, according to the first embodiment, the condensing optical system has the lamp 1, the condenser lenses 2a and 2b, and the rod integrator 3. The condenser lenses 2a and 2b condense the lights from the lamp 1 into the lens focuses thereof. The rod integrator 3 receives the lights through the incident plane 3a receives thereof, and outputs the lights through the outgoing surface 3c after the repeated total reflection at the side surface 3b. Accordingly, when compared with the conventional one, there is the effect that it is possible to suppress the spreading of the illuminant image of the illuminant 1a at the lens focus, and to reduce the loss generated in the incident plane 3a of the rod integrator 3.

Moreover, according to the first embodiment, the image display device has the condensing optical system, at least one color wheel 11, the relay optical system, the TIR prism 15, the DMD chip 16, the projecting lens 17, and the screen 18. The condensing optical system has the lamp 1, the condenser lenses 2a and 2b, and the rod integrator 3. The color wheel 11 is placed in position in front of the incident plane 3a or at the back of the outgoing plane 3c of the rod integrator 3, and separates the light into three primary colors. The relay optical system for relaying the outgoing lights from the condensing optical system has the relay lens 12, the reflection mirror 13, and the field lens 14.

The TIR prism 15 as the light modulation element gives the image information to the lights from the relay optical system and outputs the lights. The projecting lens 17 projects the lights including the image information onto the screen 18. The lights including the image information are thereby displayed on the screen 18. Therefore it is possible to obtain the effects to reduce the loss generated at the incident plane 3a of the rod integrator 3 and to improve the brightness of the image to be displayed on the screen 18.

In the design for the lamp 1, it is not necessary to completely cover the dead zone D with the light flux, because the sectional area of the light flux output from the lamp front lens 1c becomes spread when the deformed lamp reflector 1b reflects the lights so that the dead zone D is reduced in area. Therefore the same effect can be obtained.

Second Embodiment

Because an image display device having a liquid crystal panel uses polarized lights, when it receives the outgoing light from a lamp as a light source without any polarization of light, one polarized component which is perpendicularly intersected to the other polarized component to be used is eliminated. When the image display device using the liquid crystal panel receives the light from the lamp, a method to align both the polarized components is applied. This method uses the combination of a lens array and a polarized conversion element. The second embodiment of the present invention will now explain the polarization converting optical system using the lamp 1 of the first embodiment.

Figure 16:
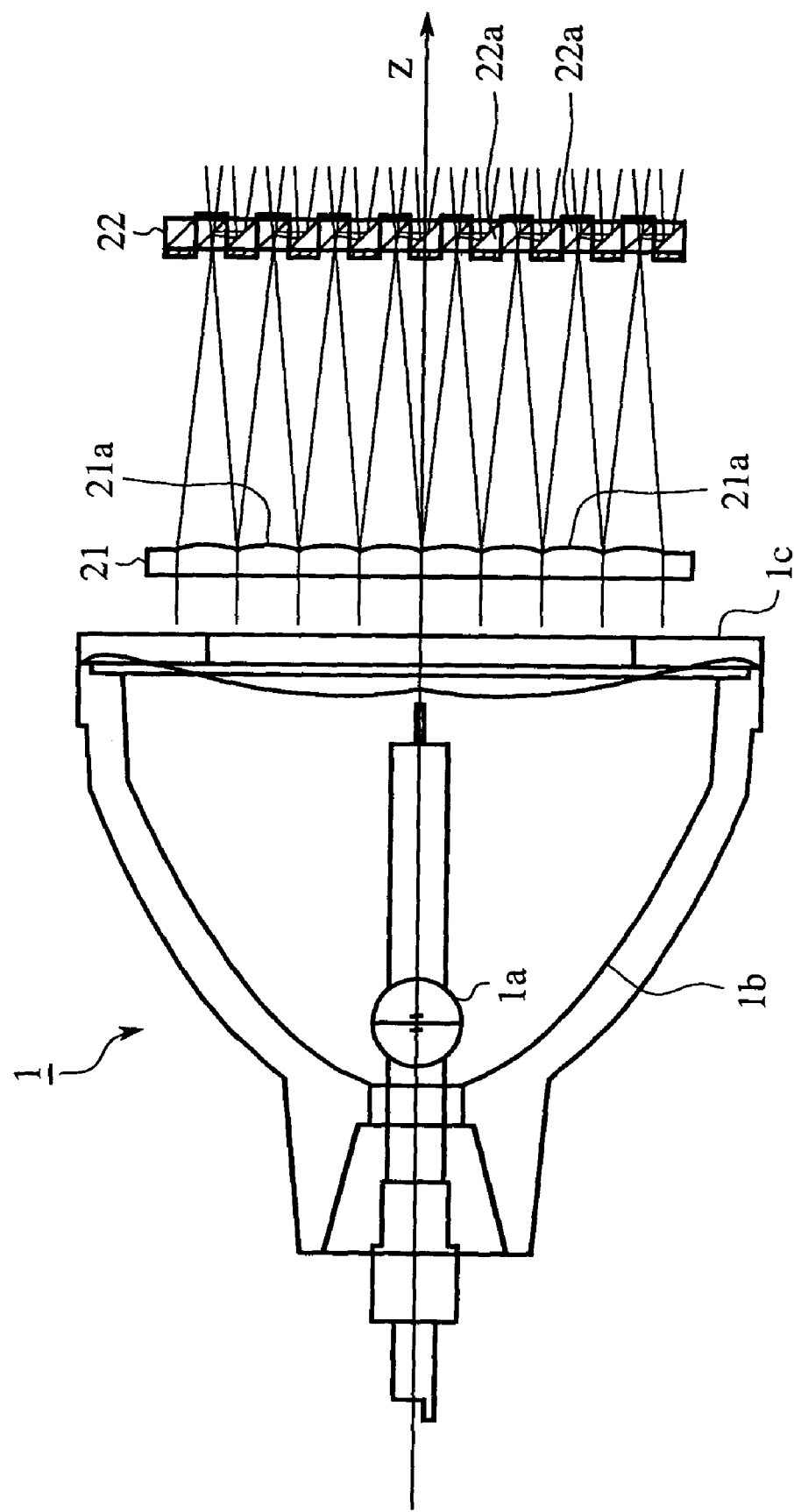
FIG. 16 is a diagram showing a configuration of a polarization converting optical system according to a second embodiment of the present invention.

FIG. 16 is a diagram showing a configuration of the polarization converting optical system according to the second embodiment, which is used for inputting the light into the liquid crystal panel. The same components in the case shown in FIG. 9 will be referred to with the same reference numbers and characters.

In FIG. 16, reference number 21 designates a lens array in which a plurality of lenses 21a are arranged in array. Reference number 22 indicates a PBS array (polarization conversion element) made up of a plurality of polarization beam splitters 22a. The PBS array 22 is placed near the lens focus of the lens array 21. The plurality of the PBSs 22a are arranged in array with an equal space and to form the PBS array 22.

Most of the lights emitted from the illuminant 1a as the light source are reflected by the aspherical reflection surface of the deformed lamp reflector 1b. The sectional area of the light flux of the reflected lights is enlarged according to the transmission in the forward direction of the optical axis and the distribution of the light flux becomes uniform. The light from the deformed lamp reflector 1b traveling toward the forward direction of the optical axis Z passes through the lamp front lens 1c, and is finally output from the lamp 1 as approximately parallel light. In this case, the aspheric reflection surface is so formed that the sectional area of the parallel light flux becomes greater and the distribution of the light flux becomes uniform regardless of the outgoing position from the lamp front lens 1c.

The parallel lights output from the lamp 1 are transmitted through each lens 21a in the lens array 21 and then condensed to the lens focus near the PBS array 22. After this, a S polarized component in the lights from the PBS array 22 is used in following optical systems.

Figure 17:
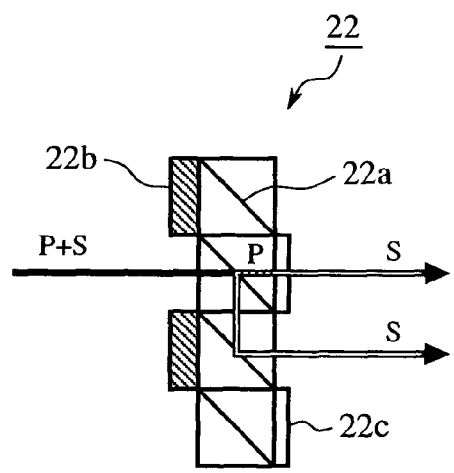
FIG. 17 is a diagram to explain the operation of a PBS array.

FIG. 17 is a diagram explaining the operation of the PBS array 22. In FIG. 17, the same components in the case shown in FIG. 16 will be referred to with the same reference numbers and characters. In FIG. 17, reference character 22b designates an obstructer to obstruct the light, and 22c denotes a phase-difference film for converting P polarized component into S polarized component. The obstructer plate 22b and the phase-difference film 22c are formed on the incident plane and the outgoing plane of each PBS 22a. For example, the phase-difference film 22c is applied onto each PBS 22a adjacent to the other PBS 22a whose incident plane has the obstructer 22b.

The random light (designated by reference characters P+S shown in FIG. 17) made up of P polarized component (orthogonal polarized component) and S polarized component (orthogonal polarized component) from the lamp 1 is input into the PBS 22a on which the phase-difference film 22c is applied. The PBS 22a separates the input random light into the P polarized component (indicated by the reference character P shown in FIG. 17) and the S polarized component (indicated by the reference character S shown in FIG. 17). The P polarized component P travels straight through the PBS 22a and converted into the S polarized component by the phase-difference film 22c, and output through the PBS array 22 to outside thereof.

On the other hand, the S polarized component is reflected to one of the adjacent PBS 22a, and then reflected toward the direction of the optical axis Z, again, and output as the S polarized component from the PBS array 22.

The PBS array 22 operates correctly only when the light is input into the PBS 22a on which the phase-difference film 22c is applied. The light input into the PBS 22a having no phase-difference film 22c becomes P polarized light which is not used in the liquid crystal panel. For this reason, in order to avoid the excess light the obstructer 22b is applied to the PBS 22a on which the phase-difference film 22c is not attached.

Figure 2:
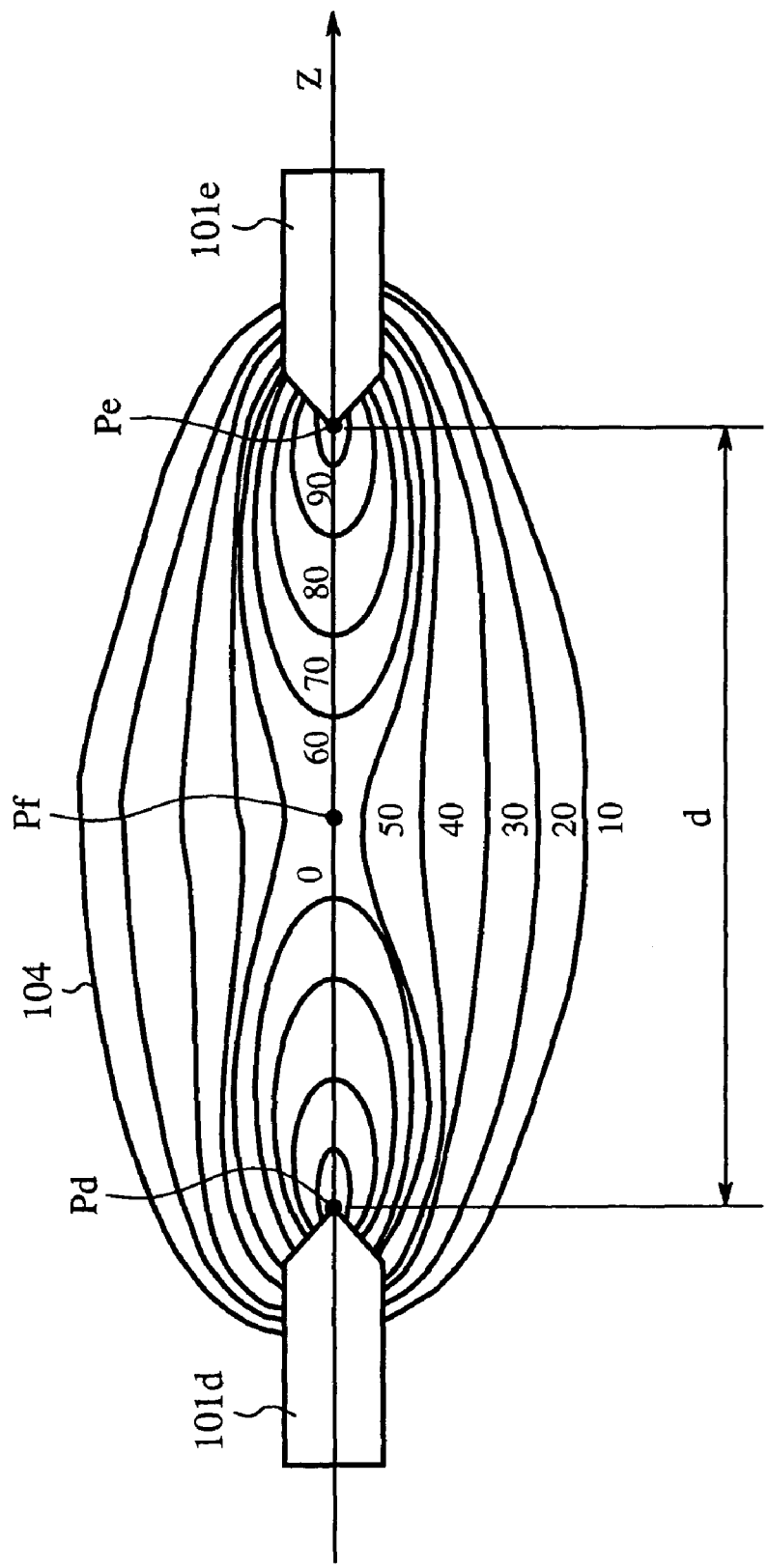
FIG. 2 is a diagram showing a typical brilliance distribution characteristic of an illuminant.

As shown in FIG. 2, the shape of the light source of the illuminant 1a has the arc length "d" toward the direction of the optical axis Z.

Figure 18A:
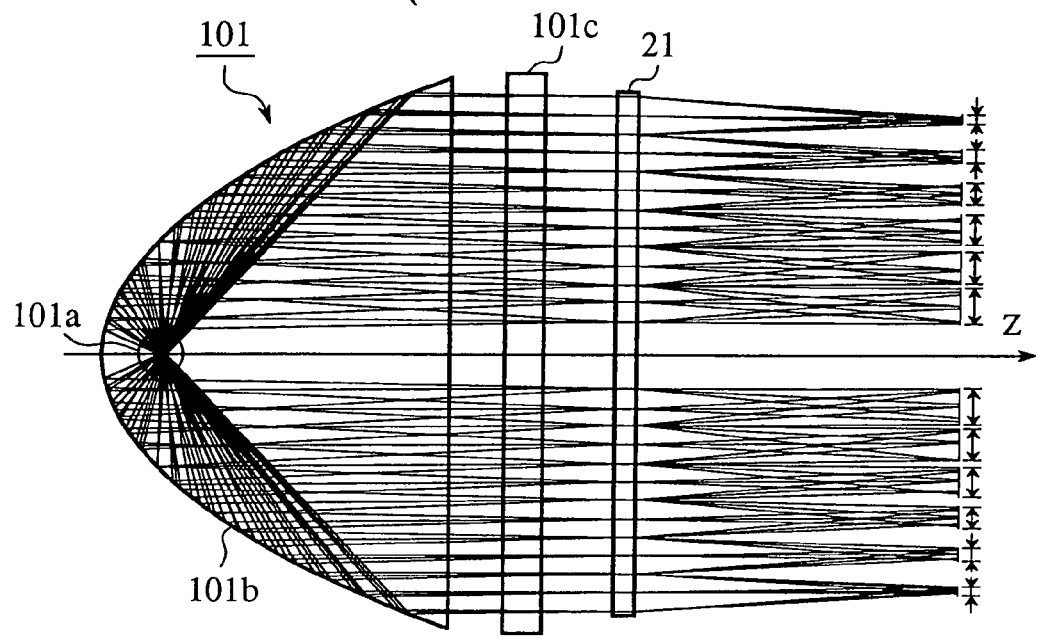
FIGS. 18A and 18B are diagrams to compare the lamp of the present invention with the conventional lamp, which have a lens array.
Figure 18B:
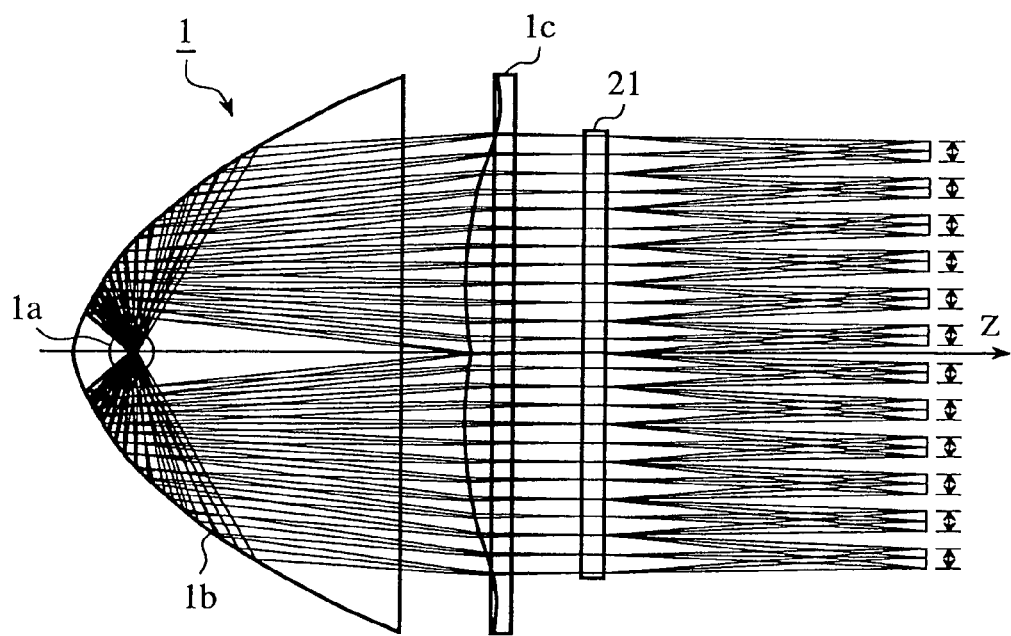

FIG. 18A and FIG. 18B show the focus points at which the lights emitted from the front points Pd and Pe of the electrodes of the illuminant 1a and the center point Pf thereof are condensed after passing through the lens array 21 based on the consideration of this fact.

FIG. 18A and FIG. 18B are diagrams to compare the lamp 1 of the present invention with the conventional lamp 101, both of which have the lens array 21.

FIG. 18A shows the case of the conventional lamp 101, and FIG. 18B shows the case of the lamp 1 of the present invention. In those diagrams, the same components in the case shown in FIG. 16 will be referred with the same reference numbers and characters.

From the case shown in FIG. 18A, it is understood that the magnitude of the illuminant image becomes large according to decreasing of the distance of the light flux from the optical axis Z, and it becomes small according to increasing of the distance thereof because the divergent angle becomes larger according to the decreasing of the distance of the light flux emitted from the lamp 101 to the optical axis Z.

That is, in a case to apply the lamp 101 having the lens array 21 to the PBS array 22, at the area in the PBS array 22, in which the PBS 22a are arranged with equal spaces, near the optical axis Z, the loss of the amount of light caused by the obstruct plate 22b in the PBS array occurs because the size of the illuminant image is greater and the amount of the lights reflected by the obstruct plate 22b becomes large.

On the contrary, in the case of the present invention shown in FIG. 18B, because the divergent angle of the light flux from the lamp 1 is uniform regardless of the distance from the optical axis Z, the spreading of the illuminant image becomes uniform at each lens 21a of the lens array 21 regardless of the distance from the optical axis Z. Accordingly, when the lamp 1 having the lens array 21 is applied to the PBS array 22, it is possible to increase the use-efficiency of light in the optical system because the amount of the reflection of the light flux occurred in the conventional case shown in FIG. 18A.

As described above, according to the second embodiment, the polarization converting optical system has the lamp 1, the lens array 21, and the PBS array 22. The lens array 21 has a plurality of the lenses 21a for focusing the light flux output from the lamp 1 with a uniform distribution into the lens focus. The PBS array 22 has a plurality of the PBS 22a arranged in a uniform space near the lens focus of the lens array 21, and aligns both the two orthogonal polarized components to each other included in the light flux, and then outputs the light flux having the aligned polarized components. It is therefore possible to decrease the amount of the reflection of the light flux at each PBS 22a near the optical axis Z and to increase the use-efficiency of light in the optical systems.

Although omitted from the diagrams, when the image display device is made up of the integrator optical system, the projection optical system, and the screen, it is possible to increase the brightness of the image to be displayed on the screen in the image display device. In this case, the integrator optical system outputs the outgoing light from the polarization converting optical system according to the second embodiment into the incident plane of the liquid crystal panel (optical modulation element). The projection optical system projects the outgoing light from the liquid crystal panel. The screen receives the lights projected from the projection optical system and displays the image based on the image information. It is thereby possible to increase the brightness of the image displayed on the screen of the image display device by the improved amount of the lights which are reflected in the conventional case.

Furthermore, the present invention is not limited by the above configuration where the image display device uses the liquid crystal panel. For example, it is possible to use the polarization converting optical system of the second embodiment in the DMD chip (as optical modulation element) as the image display device. It is also possible to improve the brightness of the image and to display the image using the polarized light.

As set forth, according to the present invention, a lamp reflector in a lamp is so formed that the paraboloid of revolution of the lamp reflector is formed by a deformation of an aspherical reflection surface which is in symmetry of rotation to the optical axis, and at least one of the incident plane and the outgoing plane of the lamp front glass is formed by a deformation of an aspherical lens surface which is in symmetry of rotation to the optical axis. Each light flux is collimated to the parallel light flux traveling from the illuminant toward its irradiation direction by applying corresponding power which is different in light flux in order to control a distribution of a divergent angle at the outgoing plane of the lamp front glass. Accordingly, when compared with the conventional lamp, it is possible to obtain the effect to output the light flux whose divergent angle is suppressed with the parallel light flux group.

According to the present invention, because a circular area, where there is no outgoing light around the optical axis area on the outgoing plane of the lamp front glass and which being generated when the light emitted by the illuminant is reflected by the paraboloid of revolution, is reduced by the reflection of the aspheric reflection surface and a lens function of the aspheric lens surface. Accordingly, when compared with the conventional lamp, it is possible to obtain the effect to output the light flux whose divergent angle is suppressed with the parallel light flux group.

According to the present invention, because the outgoing light fluxes are so output that the divergent angle of each outgoing light flux at an optional point on the outgoing plane becomes constant, it is possible to obtain the effect to output all of the light fluxes with approximately uniform divergent angle regardless of the distance of the outgoing position on the lamp front lens measured from the optical axis.

According to the present invention, a polarizing conversion optical system has the lamp described above, a lens array, and a polarization conversion element. The lens array has a plurality of lenses arranged in array and condenses outgoing lights from the lamp. The polarization conversion element has a plurality of polarizing beam splitters arranged in array placed close to a lens focus of the lens array and outputs the flux of the outgoing lights output from the lamp front glass after orthogonal polarized components included in the outgoing lights are coincided to each other. It is therefore possible to obtain the effects to greatly reduce the amount of the leaking of lights at each polarized beam splitter close to the optical axis and to increase the efficiency of the use of the light in the optical system.

According to the present invention, a condensing optical system has the lamp described above, a condenser lens group for condensing outgoing lights from the lamp into a lens focus, and a rod integrator for receiving its incident plane condensed at the lens focus and outputting the flux of the lights through its outgoing surface after repeated operations of a total reflection at a side surface of the rod integrator. When compared with the conventional one, it is therefore possible to obtain the effects to suppress the spreading of the illuminant image obtained at the lens focus of the condenser lens group, and to reduce the loss generated at the incident plane of the rod integrator.

According to the present invention, the image display device has the polarization converting optical system described above, an optical modulation element, an integrator optical system, a projecting optical system, and a screen. The optical modulation element receives incident lights from the polarization converting optical system, gives them image information, and outputs the light flux with the image information. The integrator optical system overlaps and outputs the light flux from the polarization converting optical system to the incident surface of the photo modulation element. The projecting optical system projects the light flux with the image information transmitted from the photo modulation element. The screen receives the light flux projected by the projecting optical system, and displays the image based on the light flux with the image information. It is therefore possible to obtain the effect to improve the brightness of the illuminant image to be displayed on the screen.

According to the present invention, the image display device has the condensing optical system described above, a relay optical system, an optical modulation element, a projecting optical system, and a screen. The relay optical system relays lights from the condensing optical system. The optical modulation element gives image information the lights relayed by the relay optical system, and outputs the lights with the image information. The projecting optical system projects the lights with the image information from the optical modulation element. The screen receives the lights projected by the projecting optical system, and displays the image based on the image information. It is therefore possible to obtain the effect to improve the brightness of the illuminant image to be displayed on the screen.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A lamp comprising:
   an illuminant section having an illuminant for radiating light, the light having a size determined by an arc length, wherein the arc length has a direction intersecting an optical axis of the lamp;
   a lamp reflector having a focus located at a center point of the illuminant, in the illuminant section, for reflecting, light radiated from the center point of the illuminant section, and a surface of revolution developed around the optical axis and directed toward a forward direction of the optical axis; and
   a lamp front glass perpendicular to the optical axis and having an incident surface and an outgoing surface, receiving the light flux from the lamp reflector through the incident surface and outputting a parallel light flux through the outgoing surface, wherein
      the surface of revolution of the lamp reflector is a deformation of an aspherical reflection surface rotationally symmetrical with respect to the optical axis, the aspherical reflection surface including a plurality of infinitesimal mirrors oriented at respective radiation angles with respect to the light from the illuminant section,
   each infinitesimal mirror is arranged on the surface of revolution to reflect a light ray, within an effective light reflecting area of the lamp reflector and radiated from the illuminant section, in a corresponding constant infinitesimal angle $d\theta$ along the forward direction of the optical axis so that the light rays reflected by the corresponding infinitesimal mirror intersect the lamp front glass along a corresponding constant infinitesimal length $dr$ on a line perpendicular to the optical axis, and all of the light rays radiated from the center point of the illuminant section and reflected by the lamp reflector propagate as the parallel light flux at the outgoing surface of the lamp front glass,
   $dr/d\theta$ is constant for all of the lamp reflector,
   at least one of the incident surface and the outgoing surface of the lamp front glass is a deformation of an aspherical lens surface rotationally symmetrical with respect to the optical axis, and
   distribution of a divergence angle of the light flux at the outgoing plane of the lamp front glass is constant with respect to distance perpendicular to the optical axis.

2. The lamp according to claim 1, including a circular area around the optical axis on the outgoing surface of the lamp front glass through which no outgoing light passes, generated when the light radiated by the illuminant reflected by the surface of revolution is reduced by the reflection from the reflection surface and lens function of the aspheric lens surface.

3. The lamp according to claim 1, wherein outgoing light output through the outgoing surface of the lamp front glass has a divergence angle that is constant at an arbitrary point on the outgoing surface of the lamp front glass.

4. A polarizing conversion optical system comprising:
   the lamp according to claim 1;
   a lens array comprising a plurality of lenses arranged for condensing the light from the lamp; and
   a polarization conversion element comprising a plurality of polarizing beam splitters arranged near a lens focus of the lens array, for outputting outgoing light output from the lamp front glass after orthogonal polarized components of the outgoing light are made coincident with each other.

5. An image display device comprising:
   the polarization converting optical system according to claim 4;
   an optical modulation element for receiving incident light from the polarization converting optical system, modulating the incident light with image information, and outputting the light modulated with the image information;
   an integrator optical system for overlapping and outputting the light output from the polarization converting optical system to the incident surface of the optical modulation element;
   a projecting optical system for projecting the light modulated with the image information and transmitted from the optical modulation element; and
   a screen for receiving the light modulated with the image information and projected by the projecting optical system, and displaying an image based on the light modulated with the image information.

6. A condensing optical system comprising:
   the lamp according to claim 1;
   a condenser lens group for condensing the light from the lamp at a lens focus; and
   a rod integrator for receiving at an incident plane the light condensed at the lens focus and outputting the light through an outgoing surface after repeated total internal reflection of the light within the rod integrator.

7. An image display device
   the condensing optical system according to claim 6;
   a relay optical system for relaying light from the condensing optical system;
   an optical modulation element for modulating the light relayed by the relay optical system with image information, and for outputting the light modulated with the image information;
   a projecting optical system for projecting the light modulated with the image information from the optical modulation element; and
   a screen for receiving the light modulated with the image information and projected by the projecting optical system, and for displaying an image based on the image information.

* * * * *